United States Patent
Sunabe et al.

(10) Patent No.: US 12,023,744 B2
(45) Date of Patent: Jul. 2, 2024

(54) DRILLING TOOL

(71) Applicant: MAKITA CORPORATION, Anjo (JP)

(72) Inventors: Hikaru Sunabe, Anjo (JP); Akihiro Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 676 days.

(21) Appl. No.: 17/298,370

(22) PCT Filed: Dec. 13, 2019

(86) PCT No.: PCT/JP2019/049016
§ 371 (c)(1),
(2) Date: May 28, 2021

(87) PCT Pub. No.: WO2020/129859
PCT Pub. Date: Jun. 25, 2020

(65) Prior Publication Data
US 2022/0001462 A1     Jan. 6, 2022

(30) Foreign Application Priority Data

Dec. 20, 2018   (JP) .................................. 2018-238792

(51) Int. Cl.
*B23B 45/00*     (2006.01)
*B23B 45/02*     (2006.01)
(Continued)

(52) U.S. Cl.
CPC .............. *B23B 45/02* (2013.01); *B23B 45/06* (2013.01); *B25F 5/02* (2013.01); *H02P 6/17* (2016.02);
(Continued)

(58) Field of Classification Search
CPC ......... B23B 45/00; B23B 45/02; B23B 45/06; B25D 16/00; B25D 16/006; B25F 5/00;
(Continued)

(56) References Cited

U.S. PATENT DOCUMENTS 10,688,614 B2 *   6/2020   Schaer .................. B25D 16/00
10,780,563 B2 *   9/2020   Ichikawa ............. B25D 16/006
(Continued)

FOREIGN PATENT DOCUMENTS

CN     102361729 A    2/2012
CN     202225179 U    5/2012
(Continued)

OTHER PUBLICATIONS

Apr. 13, 2023 Office Action issued in Chinese Patent Application No. 201980084539.0.
(Continued)

*Primary Examiner* — Scott A Smith
(74) *Attorney, Agent, or Firm* — Oliff PLC

(57) ABSTRACT

A drilling tool includes a tool body, a brushless motor, a first detector, a second detector and a control device. The brushless motor is housed in the tool body and configured to drive the tool accessory. The first detector is configured to detect first information corresponding to a load applied to the tool accessory. The second detector is configured to detect second information corresponding to a rotation state of the tool body around the driving axis. The control device is configured to control operation of the drilling tool. The control device is configured to set a conduction angle for the brushless motor based on the first information, and to determine, based on the first information and the second information, whether or not excessive rotation of the tool body due to jamming of the tool accessory occurs.

10 Claims, 19 Drawing Sheets

(51) Int. Cl.
  B23B 45/06     (2006.01)
  B25F 5/02      (2006.01)
  H02P 6/17      (2016.01)
  B25B 23/147    (2006.01)
  B25D 16/00     (2006.01)

(52) U.S. Cl.
  CPC ............ *B23B 45/00* (2013.01); *B25B 23/147* (2013.01); *B25D 16/00* (2013.01); *B25D 16/006* (2013.01)

(58) Field of Classification Search
  CPC ......... B25F 5/02; B25B 23/14; B25B 23/147; H02P 6/17
  USPC ................................................ 173/176, 217
  See application file for complete search history.

(56) References Cited

U.S. PATENT DOCUMENTS

| | | | | |
|---|---|---|---|---|
| 10,953,532 | B2* | 3/2021 | Sunabe | B25D 11/005 |
| 10,981,267 | B2* | 4/2021 | Abbott | H02K 7/003 |
| 11,607,790 | B2* | 3/2023 | Abbott | B25F 5/02 |
| 11,648,655 | B2* | 5/2023 | Abbott | B25F 5/02 173/179 |
| 2012/0061116 | A1 | 3/2012 | Aoki | |
| 2012/0255756 | A1 | 10/2012 | Aoki | |
| 2013/0314007 | A1 | 11/2013 | Yanagihara et al. | |
| 2013/0319710 | A1 | 12/2013 | Aoki et al. | |
| 2014/0352995 | A1 | 12/2014 | Matsunaga et al. | |
| 2016/0315489 | A1 | 10/2016 | Brotto et al. | |
| 2016/0354911 | A1 | 12/2016 | Aoki et al. | |
| 2017/0012572 | A1 | 1/2017 | Takano et al. | |
| 2017/0057064 | A1 | 3/2017 | Ishikawa et al. | |
| 2018/0038546 | A1 | 2/2018 | Nishiniya et al. | |
| 2019/0126456 | A1 | 5/2019 | Abbott et al. | |

FOREIGN PATENT DOCUMENTS

| | | | |
|---|---|---|---|
| CN | 102596508 | A | 7/2012 |
| CN | 103347658 | A | 10/2013 |
| CN | 103448035 | A | 12/2013 |
| CN | 106061685 | A | 10/2016 |
| CN | 106475948 | A | 3/2017 |
| CN | 106487286 | A | 3/2017 |
| CN | 107685315 | A | 2/2018 |
| JP | 2005-176454 | A | 6/2005 |
| JP | 2008-272880 | A | 11/2008 |
| JP | 2011-093073 | A | 5/2011 |
| JP | 2013-244581 | A | 12/2013 |
| JP | 2015-024486 | A | 2/2015 |
| JP | 2017-001115 | A | 1/2017 |
| WO | 2012/108415 | A1 | 8/2012 |
| WO | 2017/036401 | A1 | 3/2017 |

OTHER PUBLICATIONS

Oct. 18, 2023 Notice of Allowance issued in U.S. Appl. No. 17/298,093.
Jun. 16, 2021 International Preliminary Report on Patentability issued in International Patent Application No. PCT/JP2019/049016.
Mar. 3, 2020 International Search Report issued in International Patent Application No. PCT/JP2019/049017.
Jun. 16, 2021 International Preliminary Report on Patentability issued in International Patent Application No. PCT/JP2019/049017.
Feb. 8, 2022 Office Action issued in Japanese Patent Application No. 2018-238794.
Mar. 29, 2023 Office Action issued in Chinese Patent Application No. 201980084441.5.
Jul. 28, 2023 Office Action issued in U.S. Appl. No. 17/298,093.
May 28, 2021 U.S. Appl. No. 17/298,093 filed on behalf of Sunabe et al.
Feb. 8, 2022 Office Action issued in Japanese Patent Application No. 2018-238792.
Feb. 25, 2020 International Search Report issued in International Patent Application No. PCT/JP2019/049016.

* cited by examiner

DRILLING TOOL

TECHNICAL FIELD

The present invention relates to a drilling tool. More specifically, the present invention relates to a drilling tool that is capable of detecting excessive rotation of a tool body caused by jamming of a tool accessory.

BACKGROUND

In a drilling tool such as a rotary hammer and a driver-drill, if a tool accessory is jammed during operation, excessive reaction torque may act on a tool body, and the tool body may excessively rotate around a driving axis (this phenomenon is also referred to as a kickback). Some known drilling tools are configured to stop rotational driving of a tool accessory when detecting excessive rotation of a tool body due to jamming of the tool accessory. For example, Japanese Unexamined Patent Application Publication No. 2013-244581 discloses a rotary hammer that is configured to detect excessive rotation of a tool body, based on output torque of a tool accessory, which is detected by a load cell, and an acceleration of the tool body, which is detected by an acceleration sensor.

SUMMARY

Technical Problem

In the above-described rotary hammer, two kinds of sensors, i.e. the load cell and the acceleration sensor are provided only for detecting the excessive rotation of the tool body. This rotary hammer therefore leaves room for further rationalization.

It is accordingly an object of the present invention to provide a drilling tool having a rational structure for properly determining a possibility of excessive rotation of a tool body due to jamming of a tool accessory.

Solution to Problem

According to one aspect of the present invention, a drilling tool is provided that is configured to perform a drilling operation by rotationally driving a tool accessory around a driving axis. The drilling tool includes a tool body, a brushless motor, a first detector, a second detector and a control device.

The brushless motor is housed in the tool body and configured to drive the tool accessory. The first detector is configured to detect first information that corresponds to a load applied to the tool accessory. The second detector is configured to detect second information that corresponds to a rotation state of the tool body around the driving axis. The control device is configured to control operation of the drilling tool. The control device is configured to set a conduction angle for the brushless motor based on the first information. Further, the control device is configured to determine, based on the first information and the second information, whether or not excessive rotation of the tool body due to jamming of the tool accessory occurs.

In the drilling tool of this aspect, the first information (the information corresponding to the load on the tool accessory) that is detected by the first detector is used to set the conduction angle for the brushless motor. By setting of the conduction angle according to this aspect, an output torque and a rotation speed of the brushless motor can be changed according to the load applied to the tool accessory. Further, in the drilling tool of this aspect, the first information that is detected by the first detector is also used to determine whether or not the excessive rotation of the tool body due to jamming of the tool accessory occurs, together with the second information (the information corresponding to the rotation state of the tool body) that is detected by the second detector. According to this aspect, a rational structure can be obtained that is capable of not only properly determining the possibility of the excessive rotation of the tool body, but also controlling the output torque and the rotation speed of the motor according to the load on the tool accessory using the two detectors.

It is noted that the "drilling tool" in this aspect may be configured to perform only the drilling operation or to perform the drilling operation and another operation that is different from the drilling operation. Examples of the drilling tool according to this aspect may include a driver-drill, an oscillating drill (hammer driver-drill) and a rotary hammer.

In one aspect of the present invention, the control device may be configured to set the conduction angle to be smaller as the load is larger, and to set the conduction angle to a first conduction angle or to a second conduction angle that is larger than the first conduction angle. In this case, the control device may be configured to change a determination criterion for determining whether or not the excessive rotation occurs, based on a setting frequency that the first conduction angle has been set.

In the drilling tool of this aspect, a larger load is applied to the tool accessory when the conduction angle is set to the first conduction angle than when the conduction angle is set to the second conduction angle. Thus, the setting frequency of the first conduction angle generally corresponds to a ratio of a time in which a relatively large load is applied to the tool accessory with respect to a time in which the drilling operation is actually performed. According to this aspect, the determination criterion for determining the possibility of occurrence of the excessive rotation can be flexibly changed according to this ratio. It is noted that changing the determination criterion in this aspect may typically refer to raising the determination criterion (in other words, making it less likely to determine that there is a possibility of the excessive rotation) or lowering the determination criterion (in other words, making it more likely to determine that there is a possibility of the excessive rotation). Any known method may be employed to determine whether or not the excessive rotation occurs. Typically, the determination can be made based on a result of comparison between a reference value and some index value that corresponds to a state of excessive rotation of the tool body due to jamming of the tool accessory. In this case, the determination criterion can be changed, for example, through change of the reference value to be compared with the index value, or through change of a factor to be used for calculation of the index value.

In one aspect of the present invention, the control device may be configured, when the setting frequency of the first conduction angle is higher than a threshold, to set the determination criterion to be higher than when the setting frequency is equal to or lower than the threshold. An increase in the setting frequency of the first conduction angle means an increase in the ratio of the time in which the relatively large load is applied to the tool accessory. It can therefore be assumed that when the setting frequency of the first conduction angle is relatively high, a user can steadily exert, to some extent, a holding force that is sufficient to withstand an operation in which a large load is applied to the tool accessory. In such a case, according to this aspect, the determination criterion for determining the possibility of occurrence of the excessive rotation can be raised, so that the workability can be enhanced.

In one aspect of the present invention, the control device may be configured to store a setting history of the conduction angle in a storage device and to calculate the setting frequency based on the setting history.

In one aspect of the present invention, the control device may be configured to set the conduction angle to be smaller as the load is larger, and to set the conduction angle to a first conduction angle or to a second conduction angle that is larger than the first conduction angle. In this case, the control device may be configured to change an output to be produced by the brushless motor when the conduction angle is the first conduction angle, based on a determination history relating to the excessive rotation. The determination history relating to the excessive rotation can be considered to reflect the inherent strength of a user to some extent. According to this aspect, when the conduction angle is set to the first conduction angle, that is, when the load on the tool accessory is relatively large, the output can be flexibly changed, depending on the strength of the user.

In one aspect of the present invention, the control device may be configured, when a frequency that the excessive rotation has been determined to occur is higher than a threshold, to set the output to be produced when the conduction angle is the first conduction angle to be lower than when the frequency is equal to or lower than the threshold. It can be assumed that the higher the frequency that the excessive rotation has been determined to occur, relatively the weaker the strength of a user. According to this aspect, in a case where the strength of a user is assumed to be relatively weak, the output can be reduced when the conduction angle is the first conduction angle, that is, when the load on the tool accessory is relatively large, so that the safety can be enhanced.

In one aspect of the present invention, the control device may be configured to store the determination history relating to the excessive rotation and to calculate the frequency that the excessive rotation has been determined to occur, based on the determination history.

In one aspect of the present invention, the control device may be configured to set the conduction angle to be smaller as the load is larger, and to set the conduction angle to a first conduction angle or to a second conduction angle that is larger than the first conduction angle. In this case, the control device may be configured to determine whether or not the excessive rotation of the tool body occurs, only when the conduction angle is the first conduction angle. When the conduction angle is the second conduction angle, the load applied to the tool accessory is smaller than when the conduction angle is the first conduction angle, so that jamming of the tool accessory is less likely to occur. Therefore, when the conduction angle is the second conduction angle, the processing efficiency of the control device can be enhanced by omitting the determination relating to the excessive rotation.

In one aspect of the present invention, the control device may be configured to calculate an index value corresponding to the excessive rotation based on the first information and the second information and determine whether or not the excessive rotation occurs, based on a result of comparison between the index value and a reference value. Further, the control device may be configured to change the determination criterion by changing the reference value, or a factor to be used in calculation of the index value.

In one aspect of the present invention, the control device may be configured to stop the brushless motor driving the tool accessory in response to determining that there is a possibility of the excessive rotation.

DESCRIPTION OF EMBODIMENTS

First Embodiment

A driver-drill 1 according to a first embodiment is now described with reference to FIGS. 1 to 5. In this embodiment, an electric driver-drill 1 is exemplified. The driver-drill 1 is an example of a rotary tool that rotationally drives a removably coupled tool accessory (not shown), or more specifically, a drilling tool that is capable of performing a drilling operation using the tool accessory.

Figure 1:
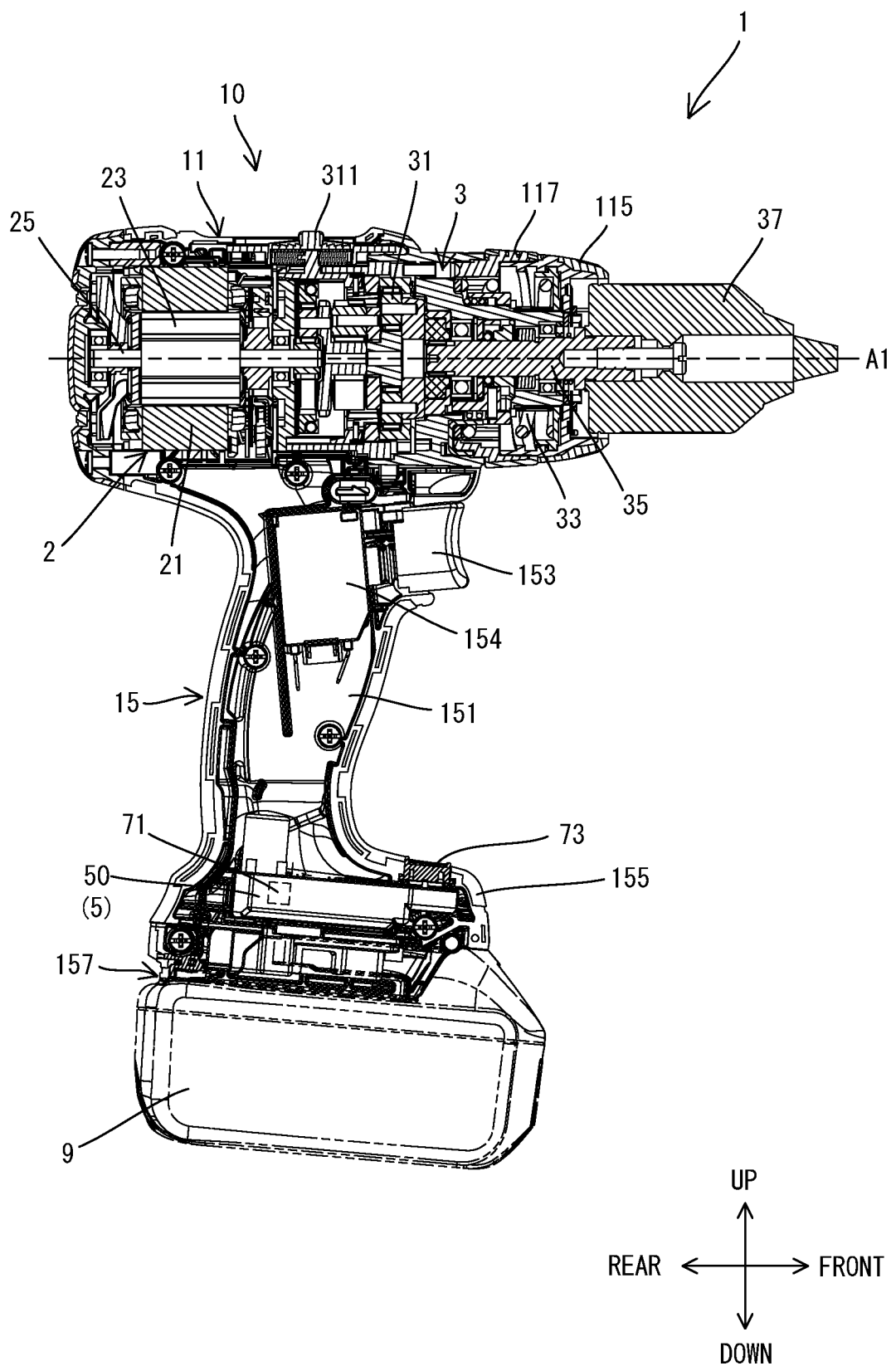
FIG. 1 is a sectional view of a driver-drill.

First, the general structure of the driver-drill 1 is described. As shown in FIG. 1, a tool body 10 forms an outer shell of the driver-drill 1. The tool body 10 includes a body housing 11 and a handle 15. The body housing 11 extends along a specified driving axis A1 and houses a motor 2 and a driving mechanism 3. A chuck 37, which is configured such that a tool accessory (not shown) is removably coupled thereto, protrudes along the driving axis A1 from one end portion of the body housing 11 in an extension direction of the driving axis A1. The handle 15 protrudes from the body housing 11 in a direction that intersects (a direction that is generally orthogonal to) the driving axis A1. The handle 15 is configured to be held by a user. A base end portion (an end portion that is connected to the body housing 11) of the handle 15 is provided with a trigger 153, which is configured to be depressed (pulled) by the user. A rechargeable battery 9 is removably mounted to a protruding end portion (a distal end portion) of the handle 15 via a battery mounting part 157.

In the following description, for convenience sake, the extension direction of the driving axis A1 is defined as a front-rear direction of the driver-drill 1. In the front-rear direction, the side on which the chuck 37 is arranged is defined as a front side and the opposite side is defined as a rear side. A direction that is orthogonal to the driving axis A1 and that corresponds to the extension direction of the handle 15 is defined as an up-down direction. In the up-down direction, the body housing 11 side of the handle 15 is defined as an upper side, and the protruding end side (on which the battery 9 is removably mounted) of the handle 15 is defined as a lower side. Further, a direction that is orthogonal to the front-rear direction and to the up-down direction is defined as a left-right direction.

The physical configuration of the driver-drill 1 is now described in detail.

The driver-drill 1 has two action modes of a drill mode and a driver mode. The drill mode is an action mode for performing a drilling operation on a workpiece by rotationally driving a drill bit, which is an example of the tool accessory. The driver mode is an action mode for performing a screw tightening operation by rotationally driving a driver bit, which is another example of the tool accessory. As shown in FIG. 1, a mode change ring 117, which is rotatable around the driving axis A1, is provided on a front end portion of the body housing 11. The user can change the action mode of the driver-drill 1 by pivoting the mode change ring 117.

The structures of elements disposed within the body housing 10 are now described. As shown in FIG. 1, the body housing 11 houses the motor 2 that serves as a driving source, and a driving mechanism 3 that is configured to drive the tool accessory using the power of the motor 2.

In this embodiment, a three-phase brushless direct current (DC) motor is employed as the motor 2. The motor 2 includes a stator 21 having coils corresponding to the three phases, a rotor 23 having permanent magnets, and a motor shaft 25 extending from the rotor 23 and configured to rotate together with the rotor 23. The motor 2 is disposed within a rear end portion of the body housing 11. A rotational axis of the motor shaft 25 extends on the driving axis A1.

In this embodiment, the driving mechanism 3 includes a planetary speed reducer 31, a clutch mechanism 33, a spindle 35 and the chuck 37. The structure of the driving mechanism 3 itself is well known and therefore briefly described.

The planetary speed reducer 31 is configured as a speed reducer that includes three stages of planetary gear mechanisms, and disposed in front of the motor 2. The planetary speed reducer 31 increases the torque that is inputted from the motor shaft 25 and outputs the increased torque to the spindle 35. The spindle 35 is thus rotationally driven around the driving axis A1. The chuck 37 is coaxially connected to the spindle 35 so as to rotate together with the spindle 35. A speed change lever 311 is provided on an upper surface of the body housing 11. The speed change lever 311 is arranged to be movable in the front-rear direction, and connected to a switching mechanism (not shown) of the planetary speed reducer 31. When the position of the speed change lever 311 is switched, the speed reduction ratio of the planetary speed reducer 31 (that is, the rotation speed of the spindle 35) is changed via the switching mechanism. The clutch mechanism 33 is arranged in front of the planetary speed reducer 31. The clutch mechanism 33 is configured to interrupt torque transmission to the spindle 35 when the torque that is outputted from the planetary speed reducer 31 reaches a set threshold in the driver mode. The threshold of the torque can be set by pivoting a torque adjusting ring 115 provided on the front end portion of the body housing 11.

The handle 15 and structures of elements disposed within the handle 15 are now described. As shown in FIG. 1, the handle 15 includes a grip part 151 and a controller housing part 155. The grip part 151 has a tubular shape and extends generally in the up-down direction. The controller housing part 155 has a rectangular box-like shape, and is connected to a lower end portion of the grip part 151 and forms a lower end portion of the handle 15.

The trigger 153 is provided on a front side of an upper end portion of the grip part 151. A trigger switch 154 is housed within the grip part 151. The trigger switch 154 is normally kept OFF and turned ON in response to a depressing operation of the trigger 153. The trigger switch 154 is configured to output signals corresponding to an amount of the operation of the trigger 153 to the controller 5 via an unshown wire when turned on.

The controller housing part 155 houses a controller 5 that is configured to control various operations of the driver-drill 1, such as driving of the motor 2. The controller 5 is mounted on a main board disposed within a case 50. In this embodiment, the controller 5 is configured as a microcomputer that includes a CPU 501, a ROM 502, a RAM 503, a timer 504 and a memory (specifically, nonvolatile memory) 505 (see FIG. 2). Further, in this embodiment, an acceleration sensor 71 is also mounted on the main board. The acceleration sensor 71 is configured to detect the acceleration of the controller 5 that moves together with the tool body 10 and to output signals indicating a detection value of the acceleration to the controller 5 via an unshown wire.

Further, an operation part 73, which can be externally operated by the user, is provided on an upper portion of the controller housing part 155. Although not shown in detail, the operation part 73 has push buttons for accepting various information inputs. It is noted that the operation part 73 may have a slide lever or a touch pad in place of the push buttons. The operation part 73 is connected to the controller 5 via an unshown wire and configured to output to the controller 5 signals indicating the input information. A battery mounting part 157 is provided in a lower end portion of the controller housing part 155. The structure of the battery mounting part 157 itself is well known and therefore not described herein.

The electrical configuration of the driver-drill 1 is now described.

Figure 2:
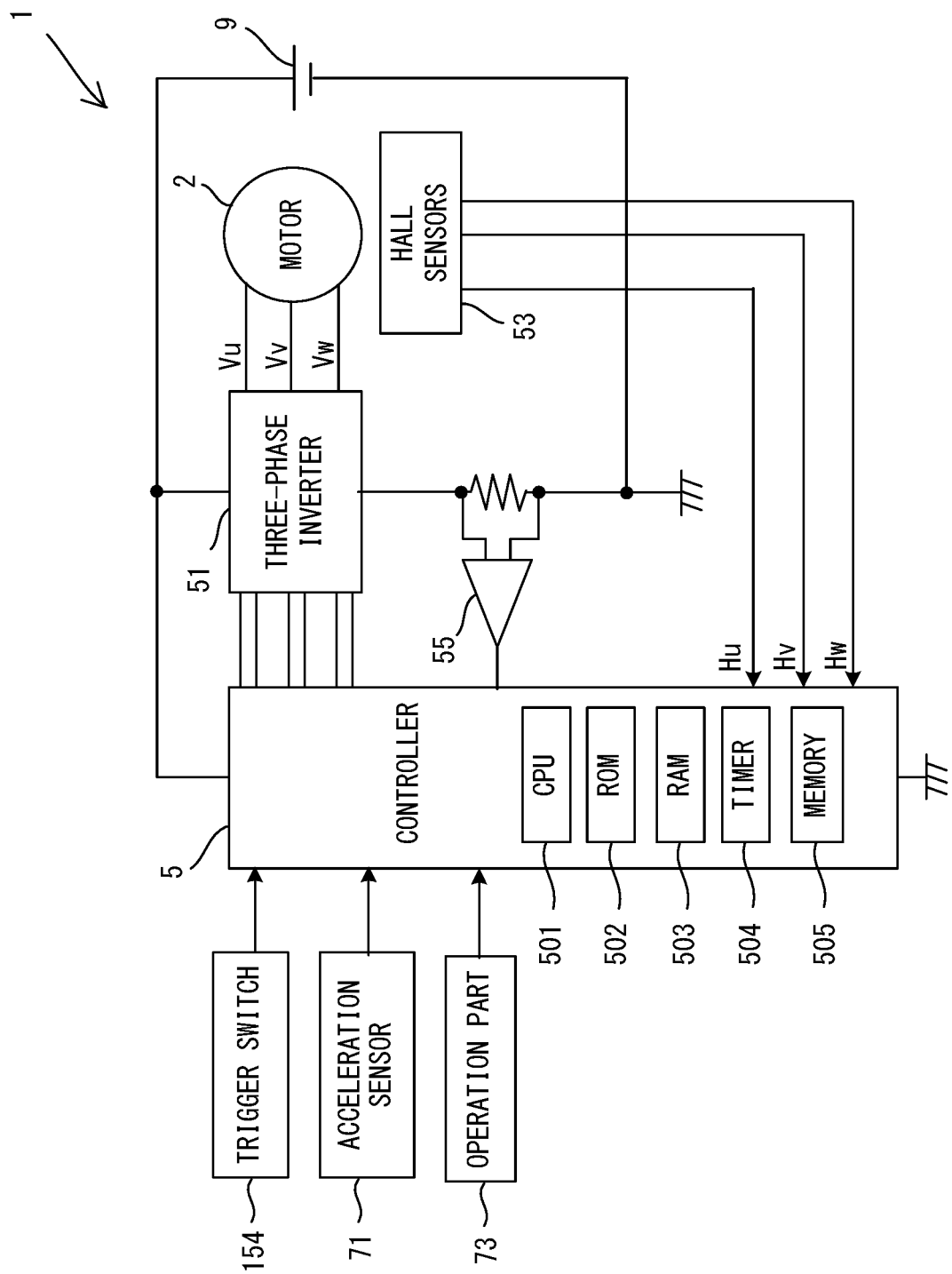
FIG. 2 is a block diagram showing an electrical configuration of the driver-drill.

As shown in FIG. 2, a three-phase inverter 51, Hall sensors 53, a current detection amplifier 55, the trigger switch 154, the acceleration sensor 71 and the operation part 73 are electrically connected to the controller 5.

The three-phase inverter 51 has a three-phase bridge circuit having six semiconductor switching elements. The Hall sensors 53 include three Hall elements corresponding to respective phases of the motor 2. The Hall sensors 53 are configured to output to the controller 5 signals indicating the rotation position of the rotor 23. The controller 5 controls energization to the motor 2 via the three-phase inverter 51 according to the signals (the rotation position of the rotor 23) from the Hall sensors 53. The controller 5 is configured to control driving of the motor 2 via the three-phase inverter 51, so that the voltage applied to each phase terminal varies according to the rotation position of the rotor 23. The controller 5 further generates PWM (pulse width modulation) signals according to the signals (the operation amount of the trigger 153) from the trigger switch 154 and outputs them to the three-phase inverter 51, thereby controlling the switching elements by PWM. As a result, the substantive voltage to be applied to the motor 2, that is, the rotation speed of the motor 2, is adjusted according to the operation amount of the trigger 153. The current detection amplifier 55 converts the current flowing through the motor 2 into voltage by shunt resistance and further outputs to the controller 5 signals amplified by the amplifier.

Control of operation of the driver-drill 1 by the controller 5 is now outlined.

In this embodiment, the controller 5 (specifically, the CPU 501) is configured to monitor information (an index value, a physical quantity) that corresponds to a load applied to the tool accessory (or a load applied to the motor 2) (hereinafter simply referred to as load information) and to control a conduction angle for the motor 2 according to the load information, thereby changing the operation characteristics of the motor 2 according to the conduction angle. Specifically, when the conduction angle is reduced, the output torque of the motor 2 increases, while the rotation speed of the motor 2 decreases. On the contrary, when the conduction angle is increased, the output torque of the motor 2 decreases, while the rotation speed of the motor 2 increases. In this embodiment, the controller 5 is capable of selectively setting the conduction angle to 120 degrees or to 150 degrees. When the load applied to the tool accessory is relatively large, the controller 5 gives priority to the output torque of the motor 2 and sets the conduction angle to the smaller angle, that is, 120 degrees. On the contrary, when the load applied to the tool accessory is relatively small, the controller 5 gives priority to the rotation speed of the motor 2 (high-speed drive of the tool accessory) and sets the conduction angle to the larger angle, that is, 150 degrees.

In the following description, driving at the conduction angle of 120 degrees and driving at the conduction angle of 150 degrees are also referred to as high-torque mode driving and low-torque mode driving, respectively. As described above, in this embodiment, the rotation speed is controlled according to the operation amount of the trigger 153. If the operation amount of the trigger 153 is the same, the output torque is higher and the rotation speed of the motor 2 is lower in the high-torque mode driving than in the low-torque mode driving.

As is well known, when the three-phase brushless motor is used as the motor 2, the current of the motor 2 increases and the rotation speed of the motor 2 decreases as the load applied to the motor 2 increases. Further, at this time, as is also well known, the current of the battery 9 increases and the voltage of the battery 9 decreases as the current of the motor 2 increases. Therefore, for example, a current value of the motor 2, the rotation speed of the motor 2, a current value of the battery 9 and a voltage value of the battery 9 can be preferably employed as the load information to be monitored by the controller 5. In this embodiment, the current value of the motor 2 detected by the current detection amplifier 55 is employed as the load information, as will be described in detail below. During driving of the motor 2, the controller 5 monitors the current value of the motor 2 detected by the current detection amplifier 55, and switches the conduction angle between 120 degrees and 150 degrees, depending on whether or not the current value exceeds a specified threshold. Such a method of setting the conduction angle of the motor 2 is disclosed, for example, in International Publication No. WO2012/108415.

Further, in this embodiment, the controller 5 (specifically, the CPU 501) is configured to monitor the load information and information (an index, a physical quantity) that corresponds to a rotation state of the tool body 10 around the driving axis A1 (hereinafter simply referred to as rotation state information) and to determine, based on these information, whether or not excessive rotation of the tool body 10 due to jamming (locking, binding) of the tool accessory occurs (that is, a possibility of occurrence of a kickback). Further, the controller 5 is configured to stop driving of the motor 2 to thereby stop rotational driving of the tool accessory in response to determining that the excessive rotation may occur (that is, that the possibility of occurrence of kickback is relatively high).

In this embodiment, as described above, the current value of the motor 2 detected by the current detection amplifier 55 is used as the load information. Further, as the rotation state information, a speed, an acceleration, an angular speed and an angular acceleration can be preferably employed. In this embodiment, the acceleration detected by the acceleration sensor 71 is employed as the rotation state information. Based on these information, the controller 5 determines whether or not the excessive rotation occurs due to jamming of the tool accessory, as will be described in detail below. Such a method of determining the possibility of the excessive rotation is disclosed, for example, in Japanese Unexamined Patent Application Publication Nos. 2011-93073 and 2013-244581.

The details of a drive control processing that is executed by the controller 5 (specifically, the CPU 501) to control driving of the motor 2, and specific operations of the driver-drill 1 during the processing are now described with reference to FIGS. 3 to 5. The drive control processing for the motor 2 is started when the trigger 153 is depressed and the trigger switch 154 is turned ON, and is terminated when driving of the motor 2 is stopped. In the following description and drawings, each "step" in the processing is simply denoted "S".

Figure 3:
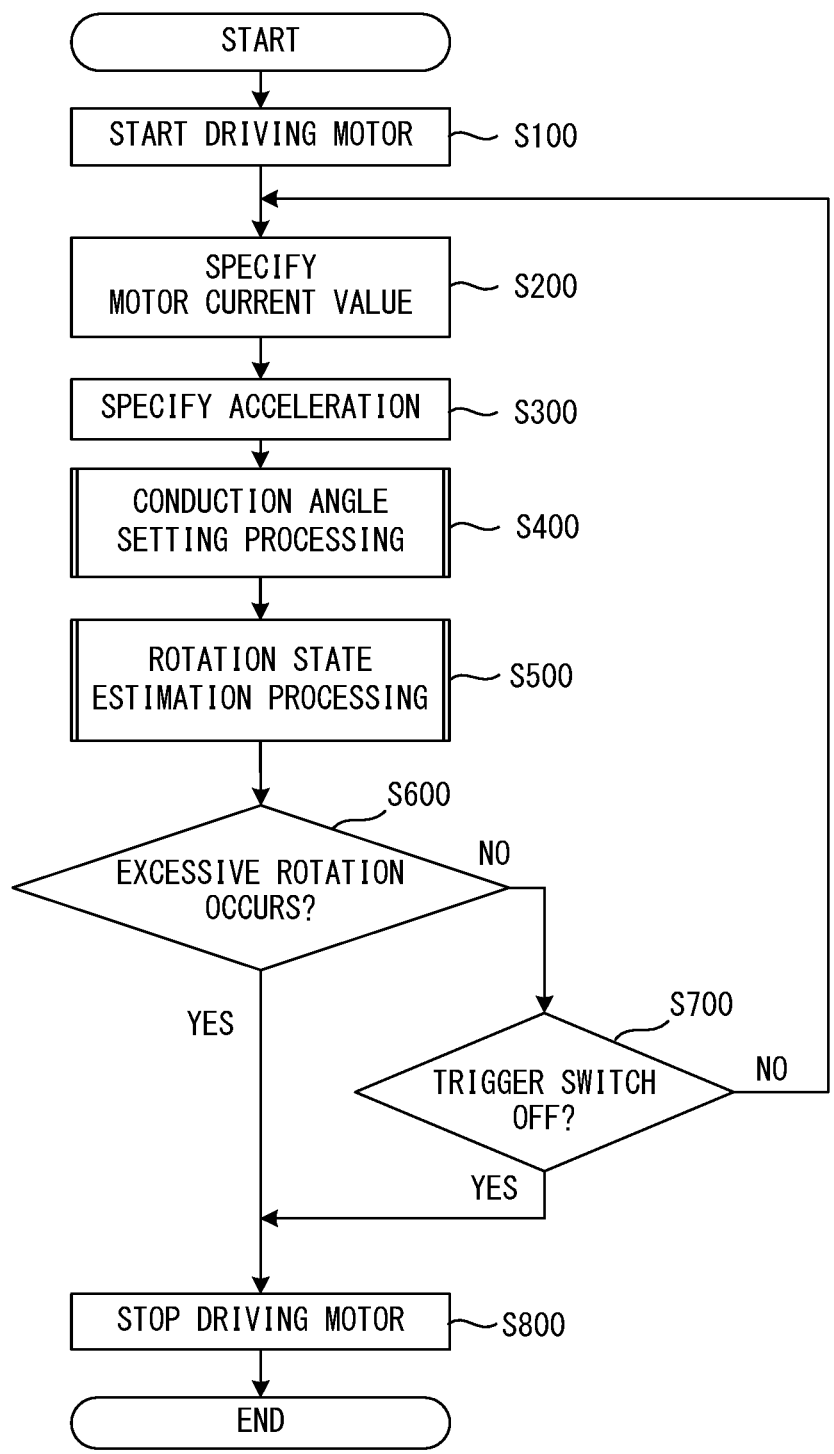
FIG. 3 is a flowchart of a motor drive control processing according to a first embodiment.
Figure 4:
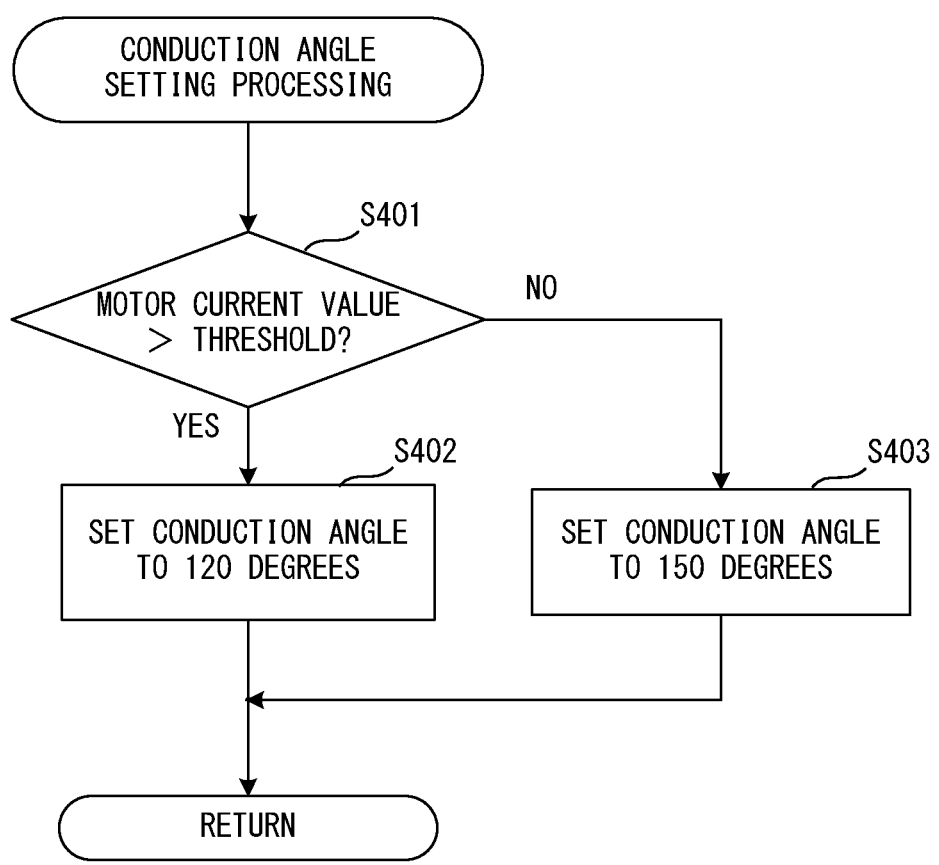
FIG. 4 is a flowchart of a conduction angle setting processing to be executed during the motor drive control processing.

As shown in FIG. 3, when the processing is started, the CPU 501 energizes the motor 2 via the three-phase inverter 51 and starts driving of the motor 2 at a rotation speed according to the operation amount of the trigger 153 (S100). In this embodiment, an initial value of the conduction angle is 150 degrees and the motor 2 is driven in the low torque mode. The CPU 501 specifies the current value of the motor 2 based on the signals from the current detection amplifier 55 (S200), and further specifies the acceleration detection value based on the signals from the acceleration sensor 71 (S300).

The CPU 501 executes a conduction angle setting processing (S400). The conduction angle setting processing is executed to set the conduction angle for the motor 2 based on the current value of the motor 2 specified in S200. As shown in FIG. 4, in the conduction angle setting processing, the CPU 501 determines whether or not the current value is larger than a threshold (S401). The CPU 501 sets the conduction angle to 120 degrees (S402), in a case where the current value is larger than the threshold (S401: YES), that is, in a case where the load on the tool accessory and the motor 2 is relatively large. On the other hand, the CPU 501 sets the conduction angle to 150 degrees (S403), in a case where the current value is equal to or smaller than the threshold (S401: NO), that is, in a case where the load on the tool accessory and the motor 2 is relatively small. The CPU 501 thereafter drives the motor 2 at the set conduction angle. The threshold that is compared with the current value in S401 may be preset and stored, for example, in the ROM 502 or in the memory 505. Further, when the conduction angle is changed from the currently set angle in S402 or in S403, it is preferable that an advance angle is also changed. A specific value of the advance angle may be preset according to the structure, function and required characteristics of the driver-drill 1 and stored in association with the conduction angle, for example, in the ROM 502 or in the memory 505.

As shown in FIG. 3, subsequently to the conduction angle setting processing, the CPU 501 executes a rotation state estimation processing (S500). The rotation state estimation processing is executed to estimate the rotation state of the tool body 10 based on the current value of the motor 2 specified in S200 and the acceleration specified in S300. In this embodiment, an angle by which the tool body 10 is expected to rotate in a period from start to stop of the rotation via detection of the acceleration (hereinafter referred to as an expected rotation angle) is calculated. The expected rotation angle is an example of the index value that indicates the state of excessive rotation of the tool body 10, that is, the degree of the excessive rotation. It is noted that this method of calculating the expected rotation angle is basically the same as the method disclosed in Japanese Unexamined Patent Application Publication No. 2013-244581.

Figure 5:
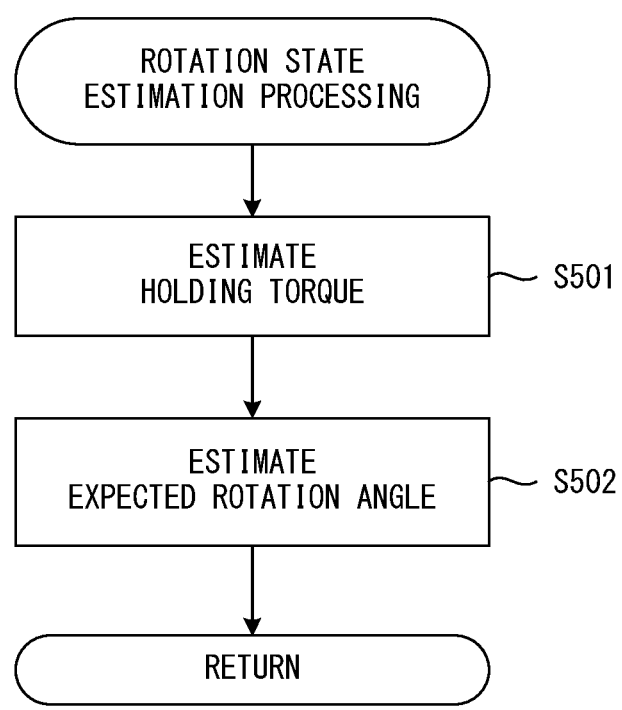
FIG. 5 is a flowchart of a rotation state estimation processing to be executed during the motor drive control processing.

As shown in FIG. 5, in the rotation state estimation processing, the CPU 501 first estimates holding torque (S501). The holding torque is an example of information that corresponds to a holding force of the user holding the tool body 10. The holding torque is torque (resistance torque) applied to the tool body 10 by the user holding the tool body 10. The holding torque can also be referred to as an external force (an external resistance force) applied to the tool body 10. The CPU 501 can obtain motor torque from the current value of the motor 2 based on known characteristics of the motor 2. The CPU 501 can also obtain an angular acceleration by performing arithmetic processing of the acceleration per unit time outputted by the acceleration sensor 71. Further, the CPU 501 can estimate the holding torque from prescribed relationship among the inertial moment, the angular acceleration, the motor torque and the holding torque. The holding torque of the user may significantly change in a short time, depending on the positional relationship between the tool body 10 and the user or other similar factors, so that the CPU 501 is configured to estimate an integrated value of the holding torque using a short integration time.

Further, the CPU 501 estimates the expected rotation angle (S502). The expected rotation angle is a total of an angle by which the tool body 10 has already rotated, an angle by which the tool body 10 will rotate before stop of energization to the motor 2, and an angle by which the tool body 10 will rotate after the stop of energization to the motor 2. The angle by which the tool body 10 has already rotated is obtained by appropriately performing arithmetic processing of the angular acceleration. The angle by which the tool body 10 will rotate before the stop of energization to the motor 2 can be estimated from the time required until the stop, assuming that the tool body 10 performs uniform motion at the angular speed obtained as an integrated value of the angular acceleration. The angle by which the tool body 10 will rotate after the stop of energization to the motor 2 can be estimated from the prescribed relationship among the inertial moment, the angular speed and the holding torque, assuming that the tool body 10 moving at the angular speed is stopped by the holding torque of the user that is obtained in S501.

As shown in FIG. 3, subsequently to the rotation state estimation processing (S500), the CPU 501 determines, based on the expected rotation angle, whether or not excessive rotation of the tool body 10 due to jamming of the tool accessory occurs (S600). More specifically, in a case where the expected rotation angle is larger than a threshold, the CPU 501 determines that there is a possibility of the excessive rotation (S600: YES), and forcibly stops driving of the motor 2, irrespective of the state of the trigger switch 154 (S800). At this time, preferably, the CPU 501 not only stops energization to the motor 2 but electrically brakes the motor 2. The threshold that is compared with the expected rotation angle to determine the possibility of the excessive rotation in S600 may be preset and stored, for example, in the ROM 502 or in the memory 505.

In a case where the expected rotation angle is equal to or smaller than the threshold, the CPU 501 determines that excessive rotation does not occur (S600: NO), and determines whether or not the trigger switch 154 is OFF (S700). In a case where the trigger switch 154 is ON (S700: NO), the CPU 501 returns to S200. While the trigger switch 154 is ON, the CPU 501 monitors the current value of the motor 2 and the acceleration, and in a case where the CPU 501 determines that the excessive rotation does not occur, the CPU 501 continues driving of the motor 2 while appropriately switching between the high torque mode and the low torque mode according to the load on the tool accessory. The tool accessory is rotationally driven during this time. In a case where the trigger switch 154 is turned OFF (S700: YES), the CPU 501 stops driving of the motor 2 (S800).

As described above, in this embodiment, the driver-drill 1 includes the tool body 10, the motor 2 that is a brushless motor, the current detection amplifier 55 that detects the motor current value that corresponds to the load on the tool accessory, the acceleration sensor 71 that detects the acceleration that corresponds to the rotation state of the tool body 10 around the driving axis A1, and the controller 5 (the CPU 501) that controls the operation of the driver-drill 1. The CPU 501 controls the output torque and the rotation speed of the motor 2 by setting the conduction angle for the motor 2 according to the motor current value. Further, the motor current value detected by the current detection amplifier 55 is also used together with the acceleration detected by the acceleration sensor 71 to determine whether or not the excessive rotation of the tool body 10 occurs due to jamming of the tool accessory. The CPU 501 can properly determine the possibility of the excessive rotation of the tool body 10 based on the motor current value and the acceleration. In this manner, the driver-drill 1 of this embodiment provides a rational structure that is capable of not only properly determining the possibility of the excessive rotation of the tool body 10, but also controlling the output torque and the rotation speed of the motor 2 according to the load applied to the tool accessory using two detectors (the current detection amplifier 55 and the acceleration sensor 71).

Second Embodiment

Figure 6:
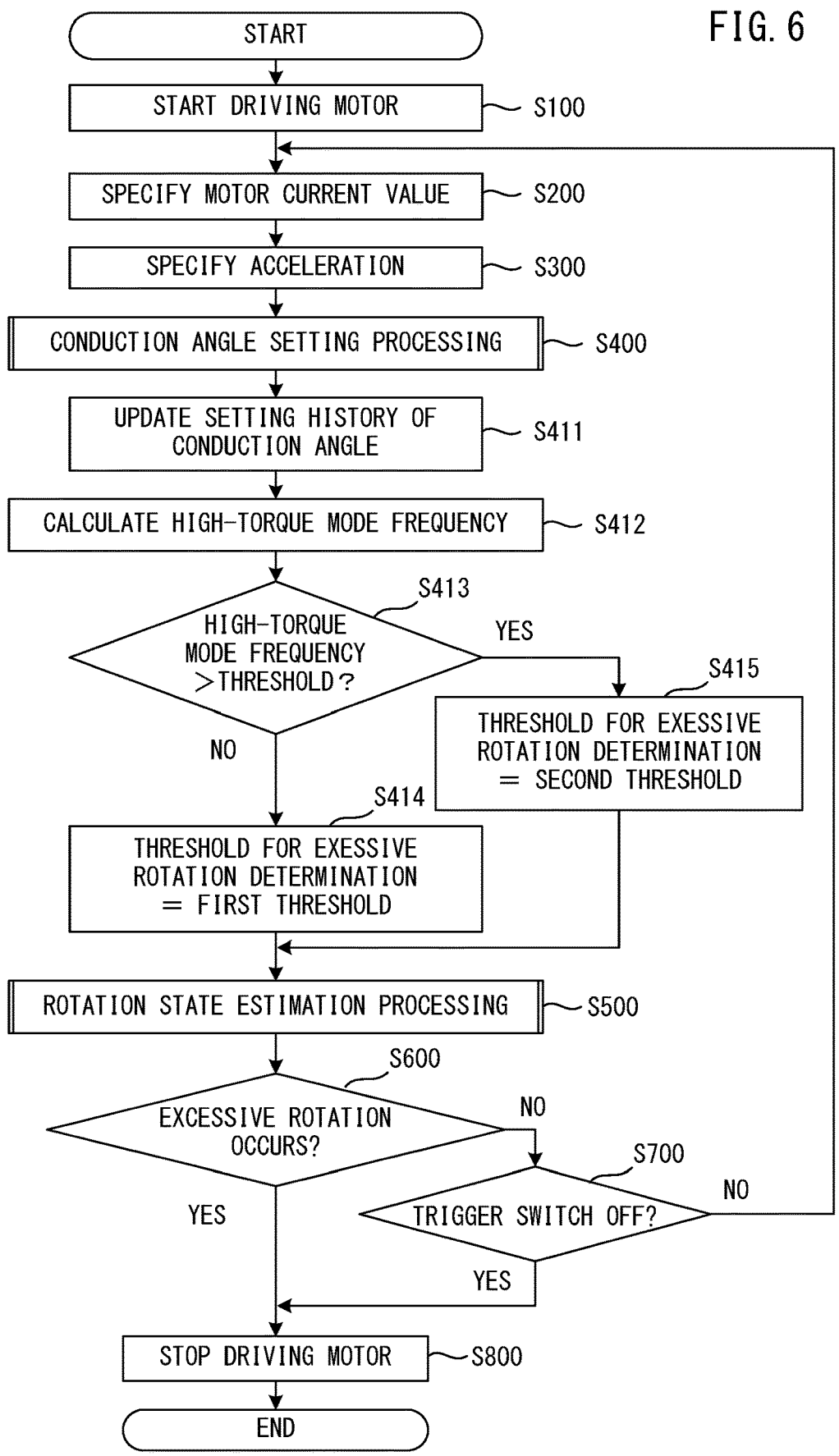
FIG. 6 is a flowchart of a motor drive control processing according to a second embodiment.

A driver-drill according to a second embodiment is now described with reference to FIG. 6. The driver-drill of this embodiment has substantially identical physical and electrical structures as the driver-drill 1 (see FIGS. 1 and 2) of the first embodiment. The contents of the drive control processing for the motor 2 to be executed by the controller 5 (the CPU 501) are, however, partly different from those of the first embodiment. The structures and the contents of the processing that are identical to those of the first embodiment are given the same numerals or step numbers, and not described or shown or only simply described or shown. The different points in the processing contents are mainly described herein. The same applies to the other following embodiments.

First, control of driving of the motor 2 in this embodiment is outlined. In this embodiment, like in the first embodiment, the CPU 501 is configured to set the conduction angle based on the current value of the motor 2 and drive the motor 2. The CPU 501 is also configured to determine whether or not the excessive rotation occurs, based on the current value and the acceleration. Further, in this embodiment, the CPU 501 is configured to change, during driving of the motor 2, the threshold for determining whether or not excessive rotation occurs, based on a setting history of the conduction angle. For this purpose, the CPU 501 is configured to store a result of setting the conduction angle each time the CPU 501 executes the conduction angle setting processing.

The drive control processing for the motor 2 in this embodiment is now described in detail. As shown in FIG. 6, when the trigger switch 154 is turned ON and the processing is started, the CPU 501 starts driving of the motor 2 in the low torque mode (S100). The CPU 501 specifies the current value of the motor 2 and the acceleration, and further sets the conduction angle based on the current value (S200, S300, S400). In this embodiment, the RAM 503 has a storage area in which the number of times the conduction angle setting processing has been executed and the number of times the conduction angle has been set to 120 degrees, as the setting history of the conduction angle. When the processing is started, the RAM 503 is initialized and both of the numbers of times are set to an initial value of zero. Subsequently to the conduction angle setting processing, the CPU 501 updates the number of times the conduction angle setting processing has been executed and the number of times the conduction angle has been set to 120 degrees that are stored in the RAM 503, to thereby update the setting history (S411).

Further, the CPU 501 calculates a ratio of the number of times the conduction angle has been set to 120 degrees to the number of times the conduction angle setting processing has been executed (this ratio is hereinafter referred to as a high-torque mode frequency) (S412). The CPU 501 compares the high-torque mode frequency with a threshold (S413). The threshold used in S413 may be preset and stored, for example, in the ROM 502 or in the memory 505. In a case where the high-torque mode frequency is equal to or lower than the threshold (S413: NO), the CPU 501 sets the threshold to be compared with the expected rotation angle (the threshold for determining the excessive rotation) in S600 to a first threshold (S414). In a case where the high-torque mode frequency is higher than the threshold (S413: YES), the CPU 501 sets the threshold for determining the excessive rotation to a second threshold (S415). The threshold for determining the excessive rotation, which is set in S414 or S415, is stored in a specified storage area of the RAM 503.

The second threshold for determining the excessive rotation is larger than the first threshold. The first threshold is an initial value that is set in consideration of a user having relatively weak strength (that is, a user who is able to exert only relatively small holding torque), so that a criterion for determining the excessive rotation based on the first threshold is relatively low. The second threshold is set in consideration of a user having relatively strong strength (that is, a user who is able to exert relatively large holding torque in a steady manner), so that a criterion for determining the excessive rotation based on the second threshold is relatively high. Based on the second threshold, therefore, it is less easily determined that there is a possibility of the excessive rotation, than based on the first threshold.

Subsequently, the CPU 501 estimates the expected rotation angle in the rotation state estimation processing (S500) and determines whether or not the excessive rotation occurs, based on the result of comparison between the expected rotation angle and the threshold (the first or second threshold) set in S414 or S415 (S600). In a case where the CPU 501 determines that the excessive rotation does not occur (S600: NO) and the trigger switch 154 is not OFF (S700: NO), the CPU 501 returns to S200. In a case where the CPU 501 determines that there is a possibility of the excessive rotation (S600: YES), the CPU 501 stops driving of the motor 2 (S800). Further, in a case where the CPU 501 determines that the excessive rotation does not occur and the trigger switch 154 is OFF (S700: YES), the CPU 501 also stops driving of the motor 2 (S800).

As described above, in this embodiment, the CPU 501 is capable of selectively setting the conduction angle to 120 degrees or to 150 degrees. Further, the CPU 501 calculates the expected rotation angle as the index value indicating the degree of rotation of the tool body 10, based on the motor current value and the acceleration. In a case where the expected rotation angle exceeds the threshold, the CPU 501 determines that there is a possibility of occurrence of the excessive rotation of the tool body 10 due to jamming of the tool accessory. Further, the CPU 501 monitors, as information relating to a use state of the driver-drill 1, the conduction angle that is set according to the load on the tool accessory and the motor 2 (specifically, the high-torque mode frequency that is the frequency the conduction angle has been set to 120 degrees). Based on the high-torque mode frequency, the CPU 501 changes the criterion for determining whether or not the excessive rotation occurs (specifically, the threshold for determining the excessive rotation).

The load applied to the tool accessory is larger when the conduction angle is set to 120 degrees than when the conduction angle is set to 150 degrees. It can therefore be said that the high-torque mode frequency generally corresponds to the ratio of the time in which a relatively large load is applied to the tool accessory to the time in which the operation is actually performed. In the processing of this embodiment, the criterion for determining the possibility of occurrence of the excessive rotation can be flexibly changed according to the state of the load applied to the tool accessory. Particularly, in this embodiment, when the high-torque mode frequency exceeds the threshold, the CPU 501 changes the threshold for the expected rotation angle to the second threshold that is larger than the first threshold, that is, the initial value. It can be said that the higher the high-torque mode frequency, the higher the ratio of the time a relatively large load is applied to the tool accessory. In such a case, it can be assumed that the user can steadily exert a holding force that is sufficient to withstand an operation in which a large load is applied to the tool accessory to a certain degree. In such a case, in this embodiment, the criterion for determining the possibility of occurrence of the excessive rotation is raised by setting the threshold for the expected rotation angle to the second threshold that is larger than the first threshold (the initial value), so that the work efficiency can be enhanced.

It is noted that while the number of times the conduction angle setting processing has been executed is small, the high-torque mode frequency may not accurately reflect whether or not the user has sufficient strength to withstand a steady high-load operation. Therefore, while the number of times the conduction angle setting processing has been executed is equal to or smaller than a specified threshold, the CPU 501 may uniformly set the threshold for the expected rotation angle to the first threshold (the initial value). Further, when the number of times the conduction angle setting processing has been executed exceeds the specified threshold, the CPU 501 may set the threshold for determining the excessive rotation according to the high-torque mode frequency in S413 to S415 as described above.

Further, in this embodiment, the setting history of the conduction angle is stored in the RAM 503 only while the drive control processing for the motor 2 is continued. Thus, the high-torque mode frequency is calculated based on the setting history of the conduction angle in one continuous operation. The setting history of the conduction angle may, however, be stored in the RAM 503 during the time when the driver-drill 1 is powered on (i.e. the battery 9 is mounted to the driver-drill 1). In this case, the CPU 501 can appropriately change the threshold based on the setting history covering a plurality of previous operations. Further, the CPU 501 may store the setting history of the conduction angle not in the RAM 503 but in the memory 505 in S411. In this case, even if the power is once turned OFF, the previous setting history of the conduction angle can be left in the memory 505. In this case, the CPU 501 may erase the setting history when the operation part 73 is externally operated to output a signal indicating an instruction of erasing the history and the CPU 501 recognizes this signal.

Third Embodiment

Figure 7:
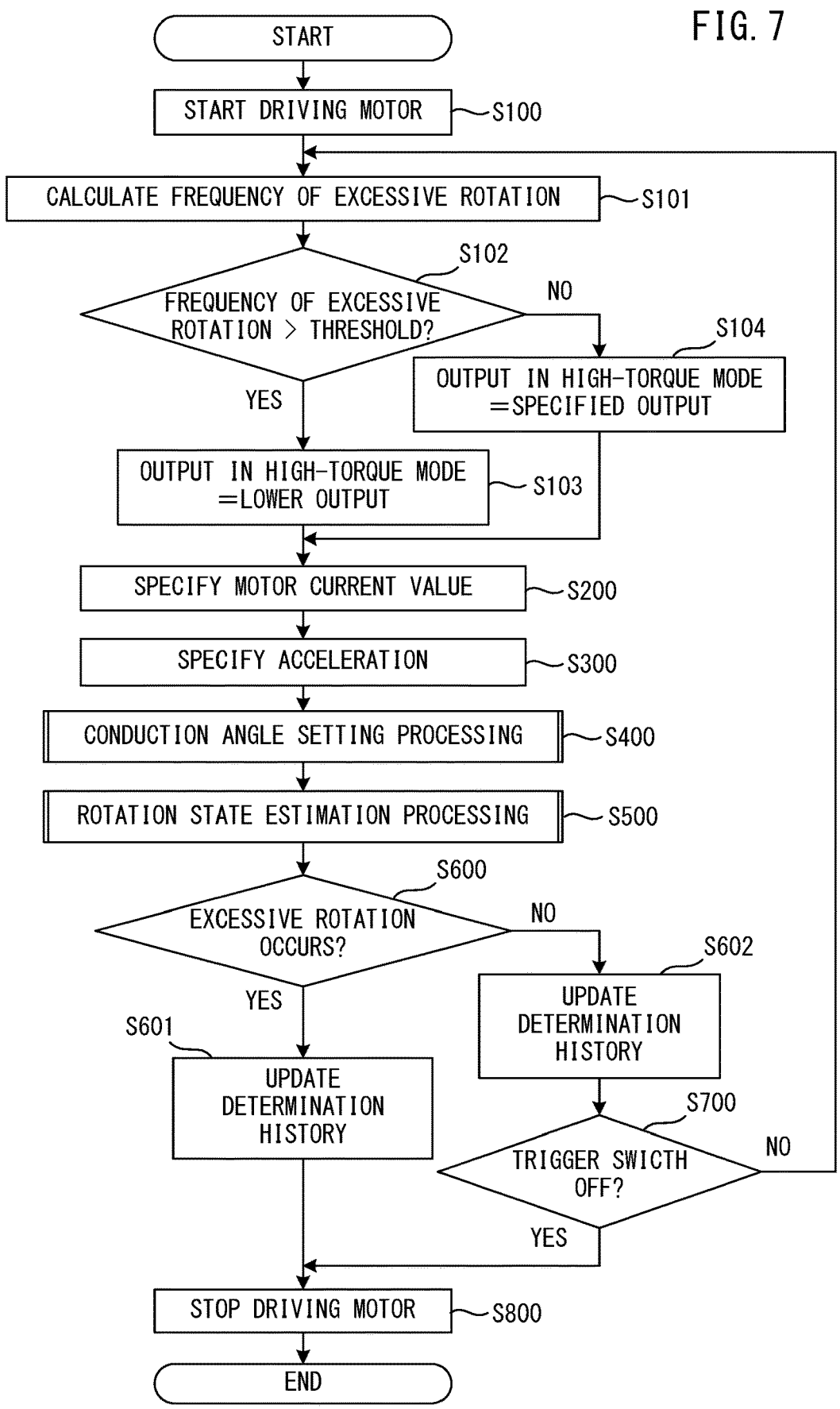
FIG. 7 is a flowchart of a motor drive control processing according to a third embodiment.

The drive control processing for the motor 2 according to a third embodiment is now described with reference to FIG. 7.

First, control of driving of the motor 2 in this embodiment is outlined. In this embodiment, like in the first embodiment, the CPU 501 is configured to set the conduction angle based on the current value of the motor 2 and drive the motor 2. The CPU 501 is also configured to determine whether or not excessive rotation occurs, based on the current value and the acceleration. Further, in this embodiment, the CPU 501 is configured to change an output to be produced by the motor 2 in the high-torque mode driving (when the conduction angle is 120 degrees), based on a determination history relating to the excessive rotation. For this purpose, the CPU 501 is configured to store a determination result each time the CPU 501 determines whether or not the excessive rotation occurs.

The drive control processing for the motor 2 in this embodiment is now described in detail. As shown in FIG. 7, when the trigger switch 154 is turned ON and the processing is started, the CPU 501 starts driving of the motor 2 in the low torque mode (S100).

The CPU 501 calculates a frequency that the CPU 501 determined in the past that the excessive rotation occurs (hereinafter simply referred to as a frequency of the excessive rotation) (S101). In this embodiment, the memory 505 has a storage area for storing the number of times the determination processing (S600) has been executed, and the number of times the CPU 101 has determined that the excessive rotation occurs, as the determination history relating to the excessive rotation. Referring to the storage area, the CPU 501 calculates the ratio of the number of times the CPU 501 has determined that the excessive rotation occurs, to the number of times the determination processing has been executed, as the frequency of the excessive rotation. The CPU 501 compares the frequency of the excessive rotation with a threshold (S102). The threshold to be used in S102 may be preset and stored, for example, in the ROM 502 or in the memory 505. In a case where the frequency of the excessive rotation is higher than the threshold (S102: YES), the CPU 501 sets the output in the high-torque mode driving to be lower than a specified output (S103). This output may be set lower, for example, by a predetermined ratio to the specified output. In a case where the frequency of the excessive rotation is equal to or lower than the threshold (S102: NO), the CPU 501 sets the output in the high-torque mode driving to be the specified output (S104). The processing in S102, S103 and S104 may be executed only when the number of times the determination processing relating to the excessive rotation has been executed exceeds a specified threshold.

Subsequently to S103 or S104, the CPU 501 specifies the current value of the motor 2 and the acceleration (S200, S300) and executes the conduction angle setting processing (S400) and the rotation state estimation processing (S500). In a case where the CPU 501 determines, based on the expected rotation angle estimated in the rotation state estimation processing, that there is a possibility of the excessive rotation (S600: YES), the CPU 501 updates the number of times of the determination processing has been executed and the number of times that the CPU 501 has determined that the excessive rotation occurs, which are stored in the memory 505, to thereby update the determination history (S601). The CPU 501 then stops driving of the motor 2 (S800). In a case where the CPU 501 determines that the excessive rotation does not occur (S600: NO), the CPU 501 updates only the number of times the determination processing has been executed, which is stored in the memory 505, to thereby update the determination history (S602). In a case where the trigger switch 154 is not OFF (S700: NO), the CPU 501 returns to S200. In a case where the trigger switch 154 is OFF (S700: YES), the CPU 501 stops driving of the motor 2 (S800).

In this manner, the determination history is stored in the memory 505 in S601 or in S602 each time the processing of determining the possibility of the excessive rotation is performed. In this embodiment, the CPU 501 erases the determination history stored in the memory 505 when the operation part 73 is externally operated to output a signal indicating an instruction of erasing the history and the CPU 501 recognizes this signal. Therefore, unless the determination history is erased, the CPU 501 appropriately changes the output in the high-torque mode driving according to the frequency of the excessive rotation that is calculated based on the determination history of the past.

As described above, in this embodiment, the CPU 501 is capable of selectively setting the conduction angle to 120 or to 150 degrees, and changes the output to be produced by the motor 2 when the conduction angle is 120 degrees (during the high-torque mode driving), based on the determination history relating to the excessive rotation, or more specifically based on the frequency that the CPU 501 has determined that the excessive rotation occurs (the frequency of the excessive rotation). The determination history relating to the excessive rotation is considered to reflect the inherent strength of the user to some extent. In the processing of this embodiment, when the conduction angle is 120 degrees, that is, when the load on the tool accessory is relatively large, the output can be flexibly changed, depending on the strength of the user.

Particularly, in this embodiment, when the frequency of the excessive rotation exceeds the threshold, the CPU 501 sets the output to be produced by the motor 2 when the conduction angle is 120 degrees (during the high-torque mode driving) to be lower than the output specified as an initial value. It can be assumed that the higher the frequency of the excessive rotation, the weaker the strength of the user. In the processing of this embodiment, in a case where the strength of the user is assumed to be weak to some extent, the output is reduced when the load on the tool accessory is relatively large, so that the safety can be enhanced.

Further, in this embodiment, the user can cause the CPU 501 to erase the determination history relating to the excessive rotation from the memory 505 by inputting the instruction of erasing the history into the operation part 73. For example, in a case where the driver-drill 1 is used by multiple users, a current user may erase the existing determination history at the start of use. Consequently, the determination criterion can be changed only based on the determination history that is stored during the use of the current user. The criterion can thus be customized for each user.

Fourth Embodiment

Figure 8:
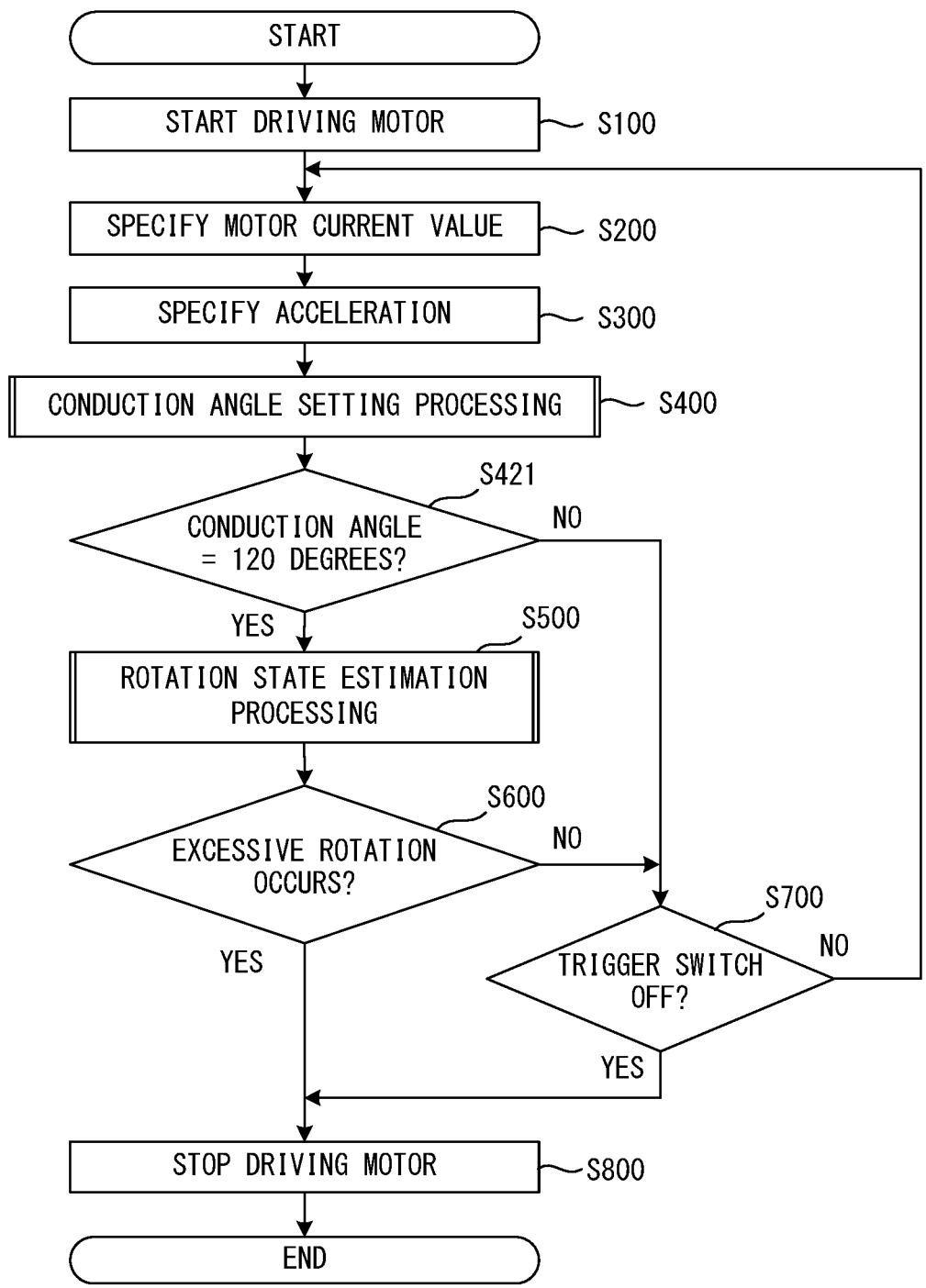
FIG. 8 is a flowchart of a motor drive control processing according to a fourth embodiment.

The drive control processing for the motor 2 according to a fourth embodiment is now described with reference to FIG. 8.

First, control of driving of the motor 2 in this embodiment is outlined. In this embodiment, like in the first embodiment, the CPU 501 is configured to set the conduction angle based on the current value of the motor 2 and drive the motor 2. The CPU 501 is also configured to determine whether or not excessive rotation occurs, based on the current value and the acceleration. In this embodiment, however, the CPU 501 determines the possibility of the excessive rotation only during the high-torque mode driving, that is, when the conduction angle is 120 degrees.

The drive control processing for the motor 2 in this embodiment is now described in detail. As shown in FIG. 8, when the trigger switch 154 is turned ON and the processing is started, the CPU 501 starts driving of the motor 2 in the low torque mode (S100). The CPU 501 then specifies the current value of the motor 2 and acceleration, and sets the conduction angle based on the current value (S200, S300, S400).

The CPU 501 determines whether or not the conduction angle set in the conduction angle setting processing is 120 degrees (S421). In a case where the conduction angle is 120 degrees (S421: YES), that is, in a case where the motor 2 is driven in the high-torque mode, the CPU 501 executes the rotation state estimation processing (S500) and determines whether or not excessive rotation occurs, based on the estimated rotation speed obtained in the rotation state estimation processing (S600). In a case where the CPU 501 determines that there is a possibility of the excessive rotation (S600: YES), the CPU 501 stops driving of the motor 2 (S800). In a case where the CPU 501 determines that the excessive rotation does not occur (S600: NO), the CPU 501 either returns to S200 or stops driving of the motor 2 (S800), depending on the state of the trigger switch 154 (S700). In a case where the conduction angle set in the conduction angle setting processing is 150 degrees (S421: NO), the CPU 501 proceeds to determination of whether or not the trigger switch 154 is OFF (S700) without executing the rotation state estimation processing (S500). In a case where the trigger switch 154 is ON (S700: NO), the CPU 501 returns to S200.

As described above, in this embodiment, the CPU 501 is capable of selectively setting the conduction angle to 120 degrees or to 150 degrees, and only when the conduction angle is 120 degrees, the CPU 501 determines whether or not excessive rotation of the tool body 10 occurs. When the conduction angle is 150 degrees, the load on the tool accessory is smaller than when the conduction angle is 120 degrees. Therefore, jamming of the tool accessory is less likely to occur. Therefore, when the conduction angle is 150 degrees, the determination of the excessive rotation is omitted, so that the processing efficiency of the CPU 501 can be enhanced.

Fifth Embodiment

The drive control processing for the motor 2 according to a fifth embodiment is now described with reference to FIGS. 9 to 12.

First, control of driving of the motor 2 in this embodiment is outlined. In this embodiment, the CPU 501 is configured to set the conduction angle based on the current value of the motor 2 and drive the motor 2. The CPU 501 is also configured to determine whether or not excessive rotation occurs, based on the current value and the acceleration. In this embodiment, however, the CPU 501 performs determination relating to the excessive rotation without using the expected rotation angle. Specifically, the CPU 501 is configured to determine that there is a possibility of occurrence of the excessive rotation due to jamming of the tool accessory when the current value and the acceleration exceed thresholds that are set for the current value and the acceleration, respectively. Each of the current value and the acceleration is an index value that corresponds to the state of the excessive rotation caused by jamming of the tool accessory. It is noted that this determination method is basically the same as the method disclosed in Japanese Unexamined Patent Application Publication No. 2011-93073. In this embodiment, the criterion for this determination is appropriately changed based on the history of the holding torque. For this purpose, the CPU 501 is configured to store the holding torque each time the CPU 501 estimates the holding torque. The holding torque is an example of the information relating to the use state of the driver-drill 1.

Figure 9:
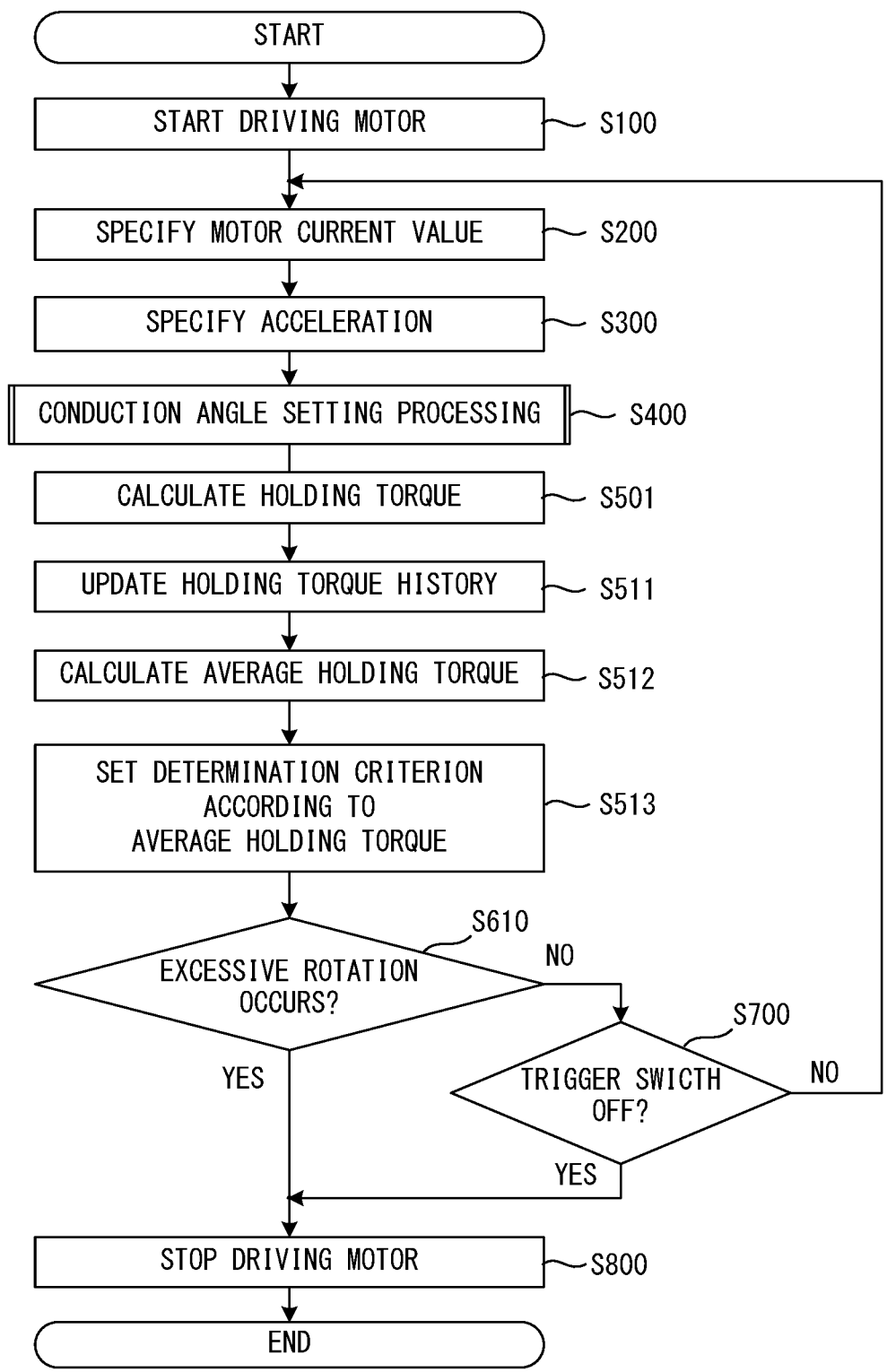
FIG. 9 is a flowchart of a motor drive control processing according to a fifth embodiment.

The drive control processing for the motor 2 in this embodiment is now described in detail. As shown in FIG. 9, when the trigger switch 154 is turned ON and the processing is started, the CPU 501 starts driving of the motor 2 in the low torque mode (S100). The CPU 501 then specifies the current value of the motor 2 and acceleration and sets the conduction angle based on the current value (S200, S300, S400).

The CPU 501 then estimates the holding torque based on the current value and the acceleration (S501). In this embodiment, the memory 505 has a storage area for cumulatively storing estimated values of the holding torque as the history of the holding torque. The CPU 501 updates the history of the holding torque by storing an estimated value of the holding torque in the storage area (S511). Further, the CPU 501 calculates an average value of the stored estimated values of the holding torque (hereinafter referred to as average holding torque) (S512).

The CPU 501 sets the criterion for determining whether or not the excessive rotation occurs, according to the calculated average holding torque (S513). It can be considered that the smaller the average holding torque, the weaker the inherent strength of a user, while the larger the average holding torque, the stronger the inherent strength of the user. In this embodiment, the CPU 501 sets the criterion for determining the possibility of the excessive rotation to be higher as the average holding torque becomes larger. Thus, the CPU 501 makes it harder to determine that there is a possibility of the excessive rotation, as the average holding torque becomes larger.

Figure 10:
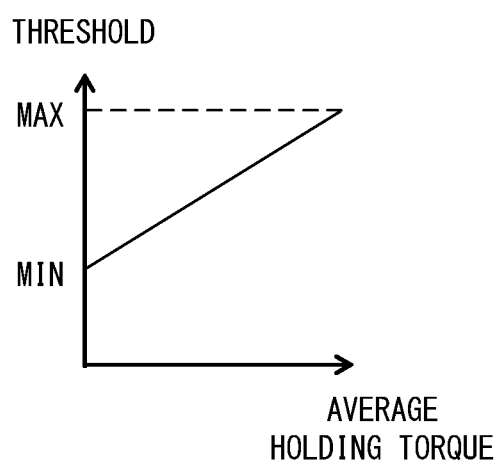
FIG. 10 shows an example of information of a correspondence between an average holding torque and a threshold.
Figure 11:
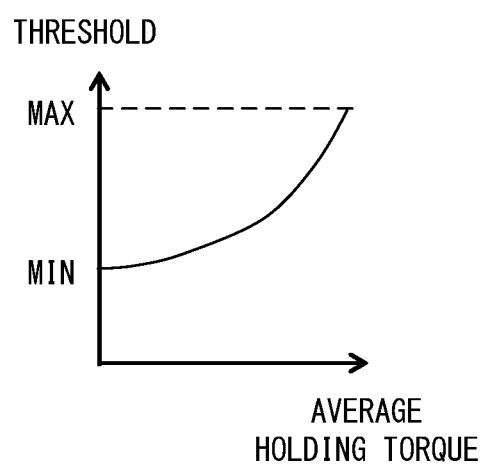
FIG. 11 shows another example of information of the correspondence between the average holding torque and the threshold.
Figure 12:
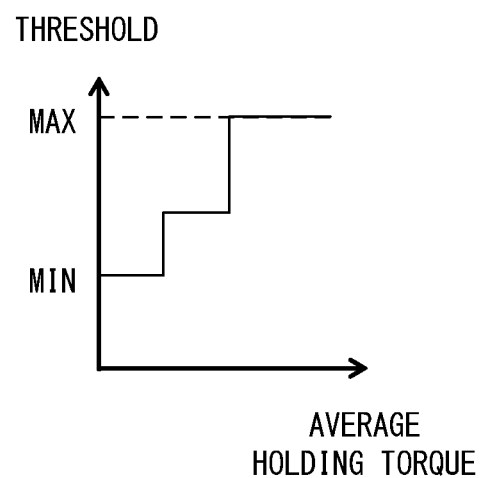
FIG. 12 shows another example of information of the correspondence between the average holding torque and the threshold.

Specifically, the CPU 501 sets a threshold for the determination, referring to correspondence information that is stored in advance in the ROM 502 or in the memory 505. The correspondence information used herein refers to information that defines a correspondence between the average holding torque and the threshold. FIGS. 10 to 12 schematically show examples of the correspondence information that can be employed in this embodiment. FIG. 10 shows an example that the threshold is raised proportionally (linearly) from the minimum to the maximum as the average holding torque becomes larger. FIG. 11 shows an example that the threshold is raised in a quadratic curve (nonlinearly) from the minimum to the maximum as the average holding torque becomes larger. FIG. 12 shows an example that the threshold is raised stepwise from the minimum to the maximum as the average holding torque becomes larger. It is noted that in S513, at least one of the thresholds for the current value and the acceleration may be set. One of the thresholds may be set as a fixed value and need not be changed.

The CPU 501 determines whether or not the excessive rotation occurs, by comparing the current value and the acceleration respectively specified in S200 and S300 with their respective thresholds (S610). In a case where at least one of the current value and the acceleration is equal to or smaller than its threshold, the CPU 501 determines that the excessive rotation does not occur (S610: NO), and then in a case where the trigger switch 154 is not OFF (S700: NO), the CPU 501 returns to S200. In a case where both of the current value and the acceleration are larger than their respective thresholds, the CPU 501 determines that there is a possibility of the excessive rotation (S610: YES) and stops driving of the motor 2 (S800). Further, in a case where the trigger switch 154 is OFF (S700: YES), the CPU 501 also stops driving of the motor 2 (S800).

Further, in this embodiment, the CPU 501 is configured to erase the holding torque history stored in the memory 505, when the CPU 501 recognizes a signal from the instruction part 73 that indicates an instruction of erasing the history. Unless the holding torque history is erased, the CPU 501 appropriately changes the threshold for determining the possibility of the excessive rotation, according to the average holding torque that is calculated based on the holding torque history.

As described above, in this embodiment, in a case where the current value of the motor 2 detected by the current detection amplifier 55 and the acceleration detected by the acceleration sensor 71 both exceed their respective thresholds, the CPU 501 determines that there is a possibility of occurrence of the excessive rotation of the tool body 10 due to jamming of the tool accessory. In this embodiment, although the criterion (method) for determining the possibility of the excessive rotation of the tool body 10 is different from that of the first embodiment, a rational structure is also achieved that is capable of not only properly determining the possibility of the excessive rotation of the tool body 10, but also controlling the output torque and the rotation speed of the motor 2 according to the load applied to the tool accessory using two detectors (the current detection amplifier 55 and the acceleration sensor 71).

Further, in this embodiment, the CPU 501 monitors the holding torque, which is the information that corresponds to the holding force of the user holding the tool body, as the information relating to the use state of the driver-drill 1, and also stores the holding torque history in the memory 505. Then, the CPU 501 changes the criterion (specifically, at least one of the thresholds for the current value of the motor 2 and the acceleration) for determining the possibility of the excessive rotation, according to the average holding torque calculated based on the holding torque history. When the tool accessory is jammed, reaction torque acts on the tool body 10. A force that withstands this reaction torque corresponds to the holding force of the user. According to the processing of this embodiment, the determination criterion is changed according to the average holding torque. Therefore, flexible determination relating to the excessive rotation can be made according to the holding force of the user. Particularly, in this embodiment, the CPU 501 lowers the determination criterion (threshold) as the average holding torque becomes smaller, and raises the determination criterion (threshold) as the average holding torque becomes larger. The safety can be thus enhanced as the holding force of the user becomes weaker, while the work efficiency can be enhanced as the holding force becomes stronger.

Particularly, in this embodiment, the CPU 501 changes the determination criterion according to the average holding torque that is calculated based on the holding torque history. This allows optimization of the determination criterion, focusing on the inherent strength of the user rather than the temporary holding force of holding the tool body 10. Further, the holding torque history is stored in the memory 505, and erased in response to the instruction of erasing the history from the operation part 73. Therefore, like in the third embodiment, in a case where the driver-drill 1 is used by multiple users, a current user may erase the existing holding torque history at the start of use. Consequently, the determination criterion can be changed only based on the holding torque history that is stored during the use of the current user.

In this embodiment, the determination criterion is changed according to the average holding torque, but the determination criterion may instead be changed according to the holding torque itself calculated in S501. In this case, flexible determination relating to the excessive rotation can be achieved according to a change in the holding force of the user. Specifically, in the drive control processing for the motor 2 shown in FIG. 9, the update of the history of the holding torque (S511) and the calculation of the average holding torque (S512) may be omitted. Further, the CPU 501 may change the determination criterion in S513, according to the estimated value of the holding torque calculated in S501. In this case, like in the examples shown in FIGS. 10 to 12, the CPU 501 may set at least one of the thresholds for the current value and the acceleration, referring to correspondence information that is defined such that the threshold is lowered as the estimated value of the holding torque becomes lower.

Sixth Embodiment

The drive control processing for the motor 2 according to a sixth embodiment is now described with reference to FIGS. 13 to 16.

First, control of driving of the motor 2 in this embodiment is outlined. In this embodiment, the CPU 501 is configured to set the conduction angle based on the current value of the motor 2 and drive the motor 2. The CPU 501 is also configured to determine whether or not excessive rotation occurs, based on the current value and the acceleration. The determination method in this embodiment is the same as that of the fifth embodiment. This embodiment is, however, different from the fifth embodiment in that the criterion (threshold) for this determination is appropriately changed based on a continuous operation time of the motor 2.

Figure 13:
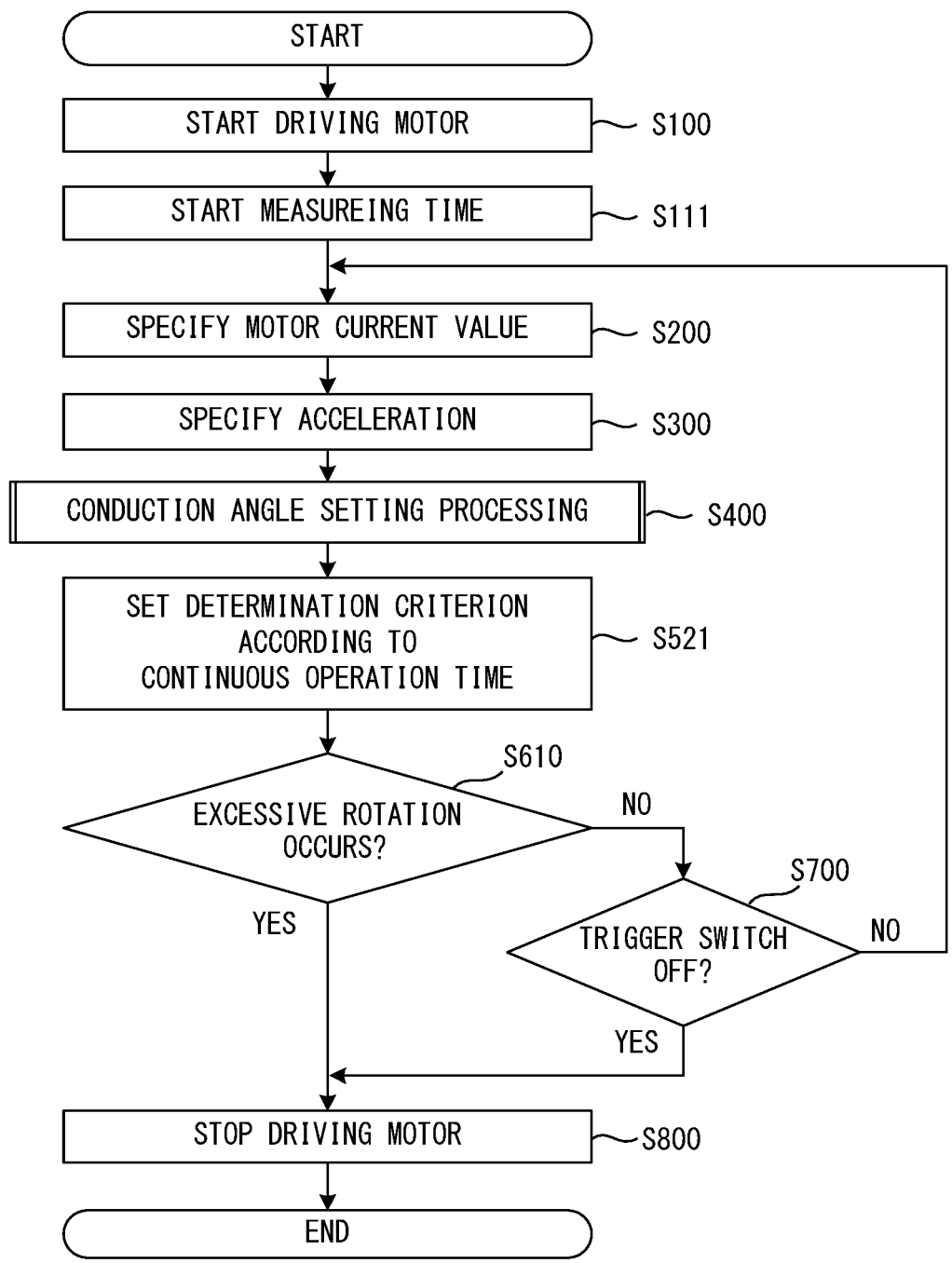
FIG. 13 is a flowchart of a motor drive control processing according to a sixth embodiment.

The drive control processing for the motor 2 in this embodiment is now described in detail. As shown in FIG. 13, when the trigger switch 154 is turned ON and the processing is started, the CPU 501 starts driving of the motor 2 in the low torque mode (S100). The CPU 501 resets a timer 504 and starts clocking in order to measure the continuous operation time of the motor 2 (S111). The CPU 501 specifies the current value of the motor 2 and the acceleration and further sets the conduction angle based on the current value (S200, S300, S400).

The CPU 501 sets the criterion for determining whether or not the excessive rotation occurs, according to the continuous operation time (the time that has elapsed since start of driving) of the motor 2 that is measured by the timer 504 (S521). The operation time of the motor 2 corresponds to the working time during which the user holds the driver-drill 1 and keeps depressing the trigger 153. Generally, it is considered that the holding force of the user holding the tool body 10 tends to decrease due to increasing fatigue of the user as the operation time becomes longer. To cope with this, in this embodiment, the CPU 501 sets the criterion for determining the possibility of the excessive rotation to be lower as the continuous operation time becomes longer. Thus the CPU 501 makes it easier to determine that there is a possibility of the excessive rotation as the continuous operation time becomes longer.

Figure 14:
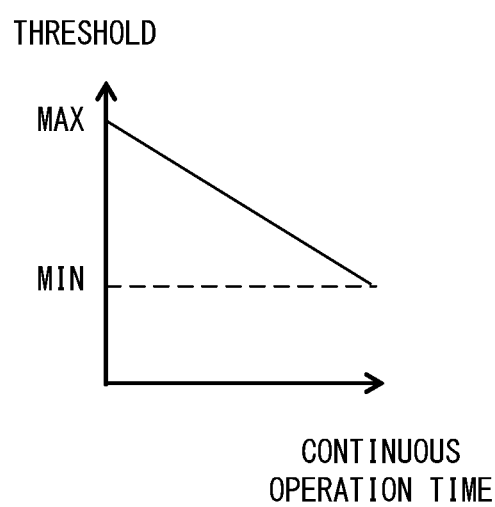
FIG. 14 shows an example of information of a correspondence between a continuous operation time and a threshold.
Figure 15:
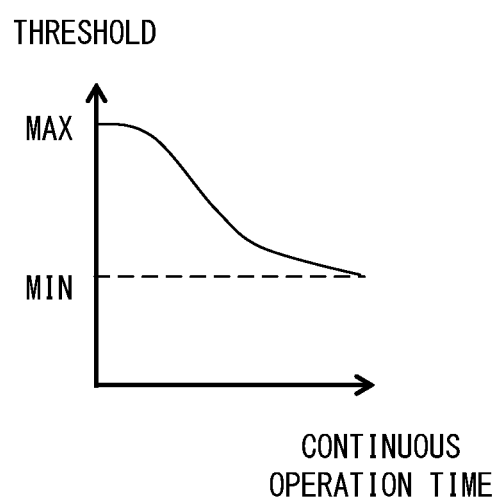
FIG. 15 shows another example of information of the correspondence between the continuous operation time and the threshold.
Figure 16:
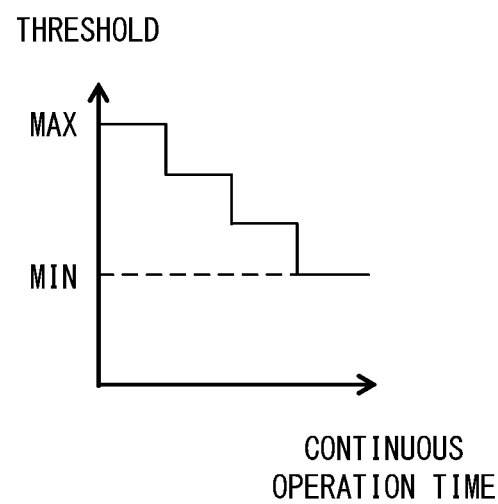
FIG. 16 shows another example of information of the correspondence between the continuous operation time and the threshold.

Specifically, the CPU 501 sets a threshold for the determination, referring to correspondence information stored in advance in the ROM 502 or in the memory 505. The correspondence information used herein refers to information that defines a correspondence between the continuous operation time and the threshold. FIGS. 14 to 16 schematically show examples of the correspondence information that can be employed in this embodiment. FIG. 14 shows an example that the threshold is lowered proportionally (linearly) from the maximum to the minimum as the continuous operation time becomes longer. FIG. 15 shows an example that the threshold is lowered nonlinearly from the maximum to the minimum as the continuous operation time becomes longer. FIG. 16 shows an example that the threshold is lowered stepwise from the maximum to the minimum as the continuous operation time becomes longer. Like in the fifth embodiment, at least one of the thresholds for the current value and the acceleration may be set in S521.

The CPU 501 determines whether or not the excessive rotation occurs, by comparing the current value and the acceleration respectively specified in S200 and S300 with their respective thresholds (S610). In a case where at least one of the current value and the acceleration is equal to or smaller than its threshold, the CPU 501 determines that the excessive rotation does not occur (S610: NO), and then in a case where the trigger switch 154 is not OFF (S700: NO), the CPU 501 returns to S200. In a case where both of the current value and the acceleration are larger than their respective thresholds, the CPU 501 determines that there is a possibility of the excessive rotation (S610: YES) and stops driving of the motor 2 (S800). Further, in a case where the trigger switch 154 is OFF (S700: YES), the CPU 501 also stops driving of the motor 2 (S800).

As described above, in this embodiment, the CPU 501 monitors the continuous operation time, which is information relating to the operation time of the motor 2, as the information relating to the use state of the driver-drill 1. The CPU 501 then changes the determination criterion according to the continuous operation time. The holding force of the user holding the tool body 10 is not always constant, but may change with time. According to the processing of this embodiment, the determination criterion is changed according to the continuous operation time of the motor 2, that is, the continuous working time of the user using the driver-drill 1. Therefore, flexible determination relating to the excessive rotation can be achieved according to a change in the continuous operation time. Particularly, in this embodiment, the CPU 501 lowers the determination criterion (threshold) as the continuous operation time becomes longer, thereby enhancing the safety.

In this embodiment, the determination criterion is changed according to the continuous operation time, but the determination criterion may instead be changed according to an operation frequency (an operation time per unit time). In this case, like in the examples shown in FIGS. 14 to 16, the CPU 501 may set at least one of the thresholds for the current value and the acceleration, referring to correspondence information that is defined such that the threshold is lowered as the operation frequency becomes higher.

Seventh Embodiment

Figure 17:
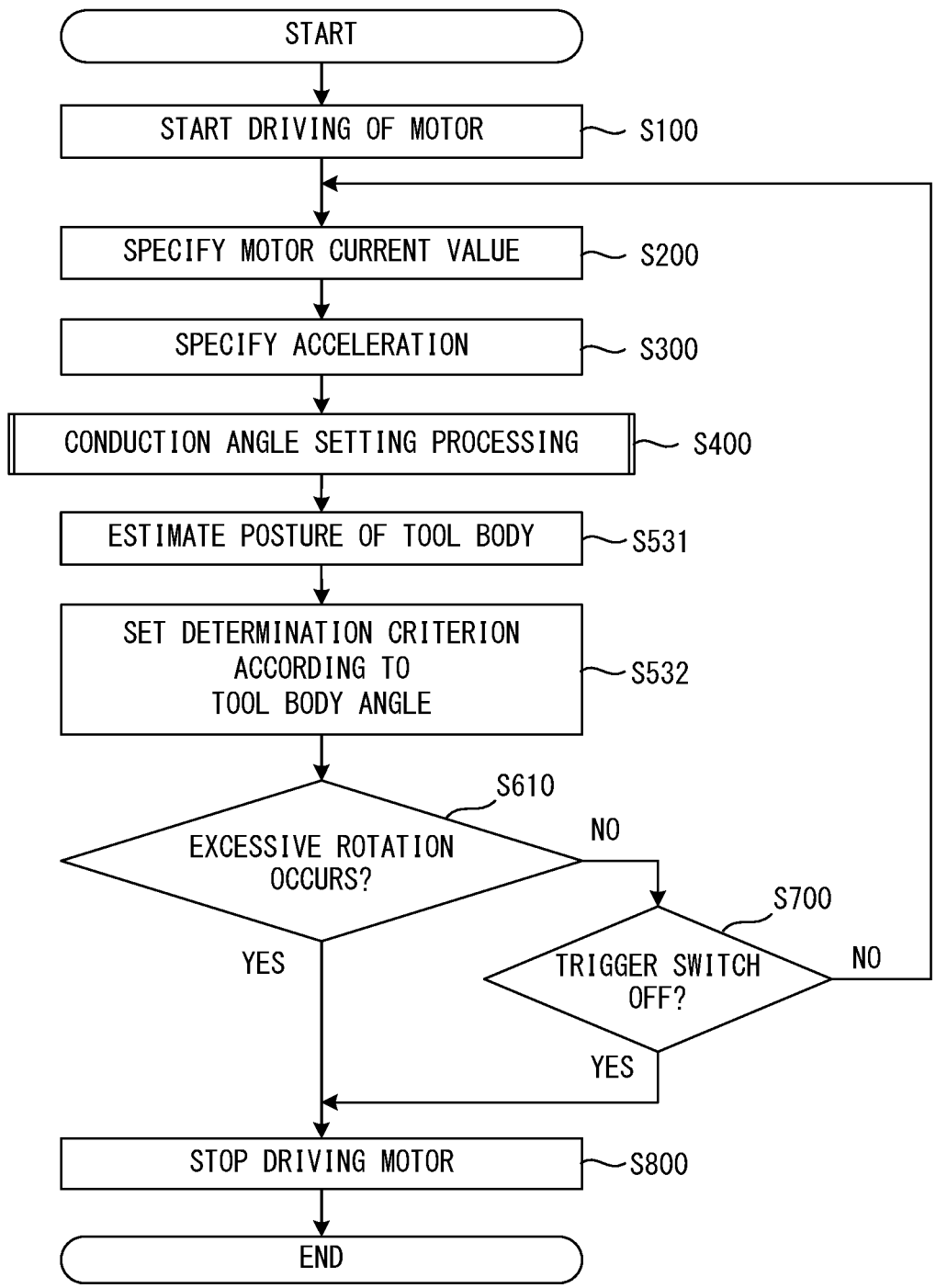
FIG. 17 is a flowchart of a motor drive control processing according to a seventh embodiment.
Figure 18:
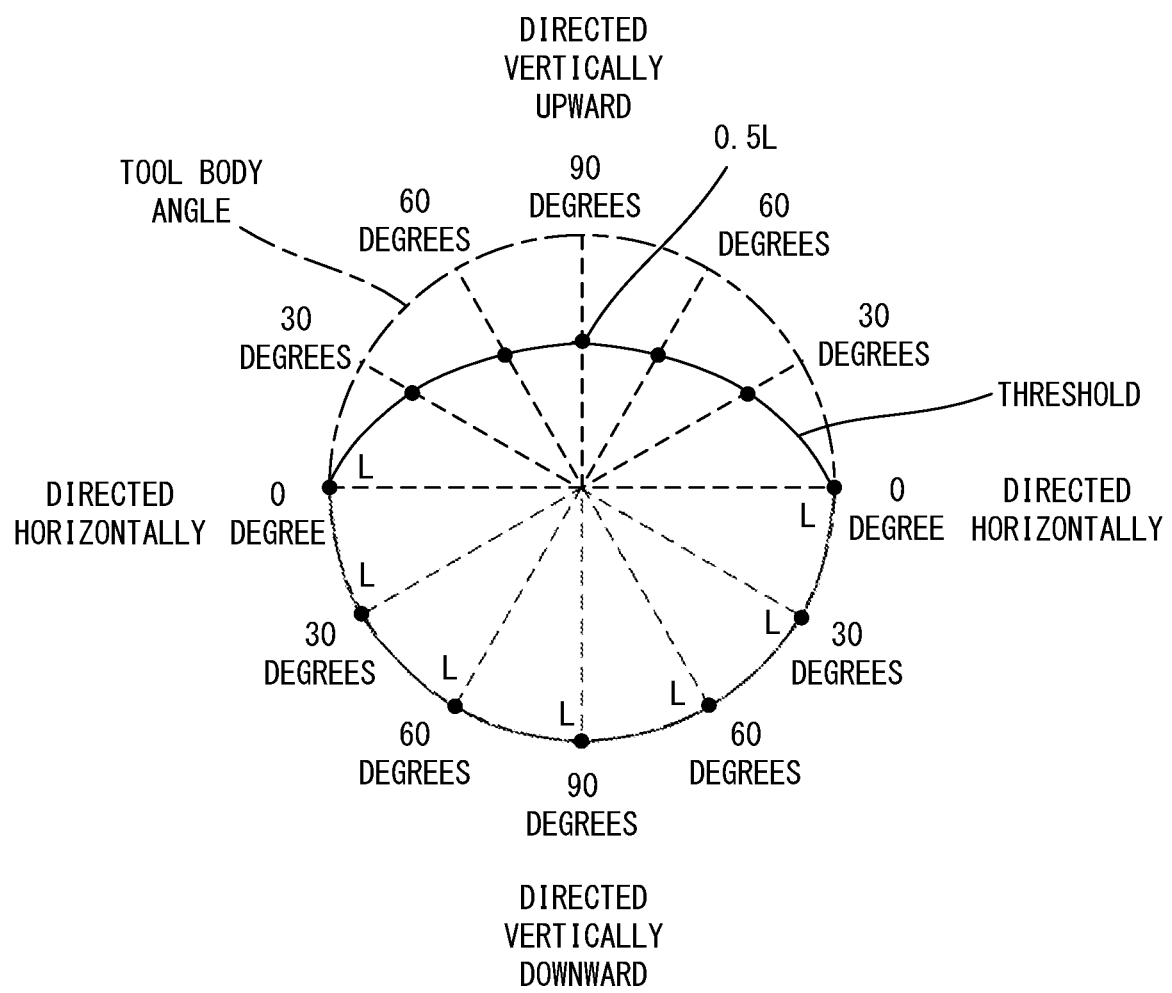
FIG. 18 shows an example of information of a correspondence between a tool body angle and a threshold.

The drive control processing for the motor 2 according to a seventh embodiment is now described with reference to FIGS. 17 and 18.

First, control of driving of the motor 2 in this embodiment is outlined. In this embodiment, the CPU 501 is configured to set the conduction angle based on the current value of the motor 2 and drive the motor 2. The CPU 501 is also configured to determine whether or not excessive rotation occurs, based on the current value and the acceleration. The determination method in this embodiment is the same as that of the fifth embodiment. This embodiment is, however, different from the fifth embodiment in that the criterion (threshold) for this determination is appropriately changed according to a posture (orientation, attitude) of the driver-drill 1 (the tool body 10).

The drive control processing for the motor 2 in this embodiment is now described in detail. As shown in FIG. 17, when the trigger switch 154 is turned ON and the processing is started, the CPU 501 starts driving of the motor 2 in the low torque mode (S100). The CPU 501 specifies the current value of the motor 2 and the acceleration and further sets the conduction angle based on the current value (S200, S300, S400).

The CPU 501 estimates the posture of the tool body 10 based on the acceleration (S531). The acceleration sensor 71 detects acceleration due to gravity as well. Based on a detected value of the acceleration sensor 71, the CPU 501 is capable of estimating, for example, an inclination angle of a detection axis of the acceleration sensor 71 with respect to the gravitational direction and thus an inclination angle of the driving axis A1 with respect to the gravitational direction (hereinafter referred to as a tool body angle), as the posture of the tool body 10 relative to the gravitational direction.

The CPU 501 sets the criterion for determining whether or not the excessive rotation occurs, according to the tool body angle (S532). It is considered that, when holding the tool body 10 with its front side (the chuck 37 side) directed upward, a user can get fatigued more easily than when holding the tool body 10 with its front side directed sideways or downward, so that the holding force of the user holding the tool body 10 tends to decrease. To cope with this, in this embodiment, the CPU 501 sets the criterion for determining the possibility of the excessive rotation to be lower as the posture of the tool body 10 becomes closer to a posture in which its front side is directed (pointed) vertically upward. Thus the CPU 501 makes it easier to determine that there is a possibility of the excessive rotation as the posture of the tool body 10 gets closer to the vertically upward directed posture.

Specifically, the CPU 501 sets a threshold for the determination, referring to correspondence information stored in advance in the ROM 502 or in the memory 505. The correspondence information used herein refers to information that defines a correspondence between the tool body angle and the threshold. FIG. 18 schematically shows an example of the correspondence information that can be employed in this embodiment. In this correspondence information, the inclination angle of the driving axis A1 when the driving axis A1 extends in the horizontal direction is defined as 0 degree, and the inclination angle of the driving axis A1 when the driving axis A1 extends in the vertical direction (gravitational direction) is defined as 90 degree. Further, a threshold that corresponds to the tool body angle in a range from 0 degree to 90 degrees vertically downward is uniformly defined as a specified value L. A threshold that corresponds to the tool body angle of 90 degrees vertically upward is defined as a half of the specified value L (0.5 L). A threshold that corresponds to the tool body angle in a range from 0 degree to 90 degrees vertically upward changes in a range from the specified value L to the half of the specified value L. Like in the fifth embodiment, at least one of the thresholds for the current value and the acceleration may be set in S532.

The CPU 501 determines whether or not the excessive rotation occurs, by comparing the current value and the acceleration specified in S200 and S300 with their respective thresholds (S610). In a case where at least one of the current value and the acceleration is equal to or smaller than the threshold, the CPU 501 determines that the excessive rotation does not occur (S610: NO), and then in a case where the trigger switch 154 is not OFF (S700: NO), the CPU 501 returns to S200. In a case where both of the current value and the acceleration are larger than their respective thresholds, the CPU 501 determines that there is a possibility of the excessive rotation (S610: YES) and stops driving of the motor 2 (S800). Further, in a case where the trigger switch 154 is OFF (S700: YES), the CPU 501 also stops driving of the motor 2 (S800).

As described above, in this embodiment, the CPU 501 monitors the tool body angle, which is information relating to the posture of the tool body 10, as the information relating to the use state of the driver-drill 1. The CPU 501 then changes the determination criterion according to the tool body angle. The holding force of the user holding the tool body 10 may not always be constant, but may change depending on the posture of the user using the driver-drill 1. According to the processing of this embodiment, the determination criterion is changed according to the posture of the tool body 10 corresponding to the working posture of the user. Therefore, flexible determination relating to the excessive rotation can be achieved according to the working posture of the user. Particularly, in this embodiment, the CPU 501 lowers the determination criterion (threshold) as the posture of the tool body 10 gets closer to the vertically upward directed posture, thereby enhancing the safety.

Correspondences between the features of the above-described embodiments and the features of the present invention are as follows. The features of the above-described embodiments are, however, merely exemplary and do not limit the features of the present invention. The driver-drill 1 is an example of the "drilling tool". The tool body 10 is an example of the "tool body". The motor 2 is an example of the "brushless motor". The current detection amplifier 55 is an example of the "first detector". The current value of the motor 2 is an example of the "first information". The acceleration sensor 71 is an example of the "second detector". The acceleration is an example of the "second information". The controller 5 (specifically, the CPU 501) is an example of the "control device". The conduction angle of 120 degrees and the conduction angle of 150 degrees are examples of the "first conduction angle" and the "second conduction angle", respectively. The high-torque mode frequency is an example of the "setting frequency of the first conduction angle". The RAM 503, the memory 505, the external storage device 79 or the battery 9 is an example of the "storage device". The frequency of the excessive rotation is an example of the "frequency that excessive rotation has been determined to occur".

The above-described embodiments are mere examples and thus a drilling tool according to the present invention is not limited to the driver-drill 1 of the above-described embodiments. For example, the following modifications may be made. Only one or a plurality of these modifications may be employed in combination with any one of the driver-drill 1 of the above-described embodiments and the claimed invention.

For example, in the above-described embodiments, the driver-drill 1 is described as an example of the drilling tool, but the present invention may be applied to other power tools, such as an oscillating drill and a rotary hammer, which are capable of performing a drilling operation by rotationally driving a tool accessory. In such power tools as the driver-drill 1 and the rotary hammer that are also capable of performing an operation other than drilling (such as a screw tightening operation and a hammering operation), the processing of determining the possibility of the excessive rotation of the tool body 10 may be executed only while the drilling operation is performed.

In the above-described embodiments, the current value of the motor 2 is employed as the information (load information) that corresponds to the load applied to the tool accessory, and the driver-drill 1 is provided with the current detection amplifier 55. However, in place of the current value of the motor 2, for example, the rotation speed of the motor 2, the current value of the battery 9 or the voltage value of the battery 9 may be employed. The rotation speed of the motor 2 can be detected by the Hall sensors 53. In the case of employing the current value of the battery 9 or the voltage value of the battery 9, a detection circuit may be appropriately provided that is configured to output signals that indicate a detected value to the controller 5.

In the case of employing the load information other than the current value of the motor 2, the conduction angle setting processing (see FIG. 4) may also be changed, depending on the employed load information. The threshold to be compared with the load information may be different, depending on whether the conduction angle is 120 degrees or 150 degrees. Such a method of setting the conduction angle of the motor 2 is disclosed, for example, in International Publication No. WO2012/108415. Further, the conduction angles that can be set are not limited to 120 degrees and 150 degrees, but may be other angles. Three or more conduction angles, not two conduction angles, may be available. The motor 2 may be a brushless motor using not a DC power source but an AC power source as a power supply input.

In the above-described embodiments, the acceleration is employed as the rotation state information, and the driver-drill 1 is provided with the acceleration sensor 71. However, in place of the acceleration, for example, a speed, an angular speed or an angular acceleration of the tool body 10 may be employed. Accordingly, a speed sensor, an angular speed sensor or an angular acceleration sensor may be provided in place of the acceleration sensor 71.

The methods of determining the possibility of the excessive rotation of the tool body 10 based on the load information and the rotation state information are not limited to the methods described in the first to fourth embodiments or the methods described in the fifth to seventh embodiments. For example, an index value that is different from the expected rotation angle and that corresponds to the state of excessive rotation caused by jamming of the tool accessory may be calculated based on the load information and the rotation state information. Further, for example, at least one of the holding torque history, the continuous operation time of the motor 2 and the tool body angle may be additionally taken into account for estimation of the expected rotation angle. Specifically, for example, a weighting factor that corresponds to the holding torque (or the average holding torque) or the continuous operation time may be introduced in the calculation of the expected rotation angle. In this case, the determination criterion may be changed by changing this factor such that the expected rotation angle is calculated to be larger as the holding torque (or the average holding torque) becomes smaller (or as the continuous operation time becomes longer). In this case, the threshold to be compared with the expected rotation angle is not changed, but the determination criterion is lowered as the holding torque (or the average holding torque) becomes smaller (or as the continuous operation time becomes longer).

The drive control processings for the motor 2 in the first to seventh embodiments may be partially replaced or combined with each other. Further, the thresholds, the index values and the correspondence information in the above-described embodiments are merely examples and can be appropriately changed, for example, according to partial replacement or combination of the processings. The information to be stored as a history in the RAM 503 or in the memory 505 can also be appropriately changed.

In each of the above-described embodiments, an example is described in which the CPU 501 executes the drive control processing for the motor 2, but other kinds of control circuits, including programmable logic devices such as ASICs (application specific integrated circuits) and a FPGA (field programmable gate array), may be employed. The drive control processing for the motor 2 may be executed by a plurality of control circuits in a distributed manner.

Figure 19:
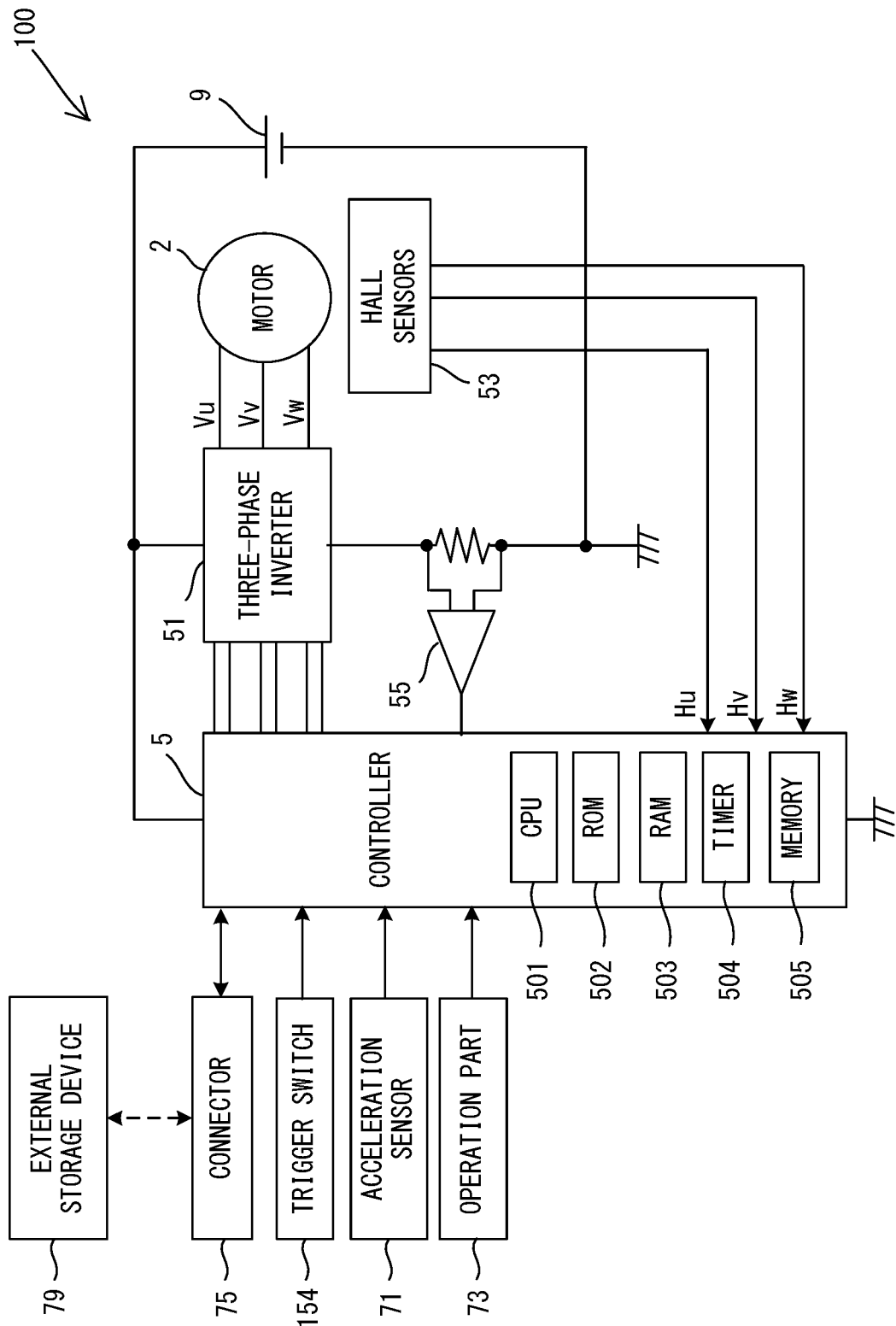
FIG. 19 is a block diagram showing an electrical configuration of a driver-drill according to a modified example.

The drive control processing of the above-described embodiments may be typically implemented by the CPU 501 executing a program stored in the ROM 502 or in the memory 505. In a modification shown in FIG. 19, a driver-drill 100 is provided with a connector 75 that is connectable to an external storage device 79 via wire or radio. In such a case, the program may be stored in the external storage device 79 (including a memory card, a USB memory and another kind of computer-readable storage medium). Further, the setting history of the conduction angle, the history of the holding torque, the determination history relating to the excessive rotation and the history of the operation time may be stored in the external storage device 79. In a case where the battery 9 has a memory that is connectable to the controller 5 via the battery mounting part 157, these histories may be stored in the memory of the battery 9. In this case, the external storage device 79 or the battery 9 can be removed from a first driver-drill 100 and connected to a second driver-drill 100 so that the histories stored in the external storage device 79 or the memory of the battery 9 can be used in the second driver-drill 100. For example, even when a user bought a new driver-drill 100, an optimum criterion can be set in the new driver-drill 100 based on the use history of the past.

Further, in view of the nature of the present invention and the above-described embodiments, the following aspects can be provided. Only one or a plurality of the following aspects can be employed in combination with any one of the driver-drills 1, 100 of the above-described embodiments and their modifications and the claimed invention.

(Aspect 1)

The drilling tool further comprises a storage device that stores correspondence information defining a correspondence between the setting frequency and the reference value or between the setting frequency and the factor, and the control device is configured to change the reference value or the factor, referring to the correspondence information.

The ROM 502 or the memory 505 is an example of the "storage device" in this aspect.

(Aspect 2)

The control device is configured to monitor information relating to a use state of the drilling tool and change a determination criterion for determining whether or not the excessive rotation occurs, according to the use state.

(Aspect 3)

The control device is configured to monitor information corresponding to a holding force of a user holding the tool body, as the information relating to the use state and to change the determination criterion according to the holding force.

(Aspect 4)

The control device is configured to estimate the holding force based on the first information and the second information.

(Aspect 5)

The control device is configured to lower the determination criterion as the holding force becomes weaker.

(Aspect 6)

The control device is configured to monitor information relating to an operation time of the motor as the information relating to the use state and change the determination criterion according to the operation time.

(Aspect 7)

The control device is configured to lower the determination criterion as the operation time becomes longer.

(Aspect 8)

The control device is configured to monitor information relating to a posture of the tool body as the information relating to the use state and change the determination criterion according to the posture of the tool body.

(Aspect 9)

The second detector is configured to detect an acceleration as the second information, and the control device is configured to calculate an inclination angle of the tool body with respect to a gravitational direction as the posture of the tool body.

(Aspect 10)

The control device is configured to lower the determination criterion as the posture of the tool body becomes closer to a posture in which the tool body is directed vertically upward.

(Aspect 11)

The control device is configured to store the information relating to the use state in a storage device.

The RAM 503, the memory 505, the external storage device 79 or the battery 9 is an example of the "storage device" in this aspect.

(Aspect 12)

The control device is configured to change the determination criterion based on a history of the information relating to the use state stored in the storage device.

(Aspect 13)

The control device is configured to erase the information relating to the use state stored in the storage device.

DESCRIPTION OF THE NUMERALS

1, 100: driver-drill, 10: tool body, 11: body housing, 115: torque adjustment ring, 117: mode change ring, 15: handle, 151: grip part, 153: trigger, 154: trigger switch, 155: controller housing part, 157: battery mounting part, 2: motor, 21: stator, 23: rotor, 25: motor shaft, 3: driving mechanism, 31: planetary speed reducer, 311: speed change lever, 33: clutch mechanism, 35: spindle, 37: chuck, 5: controller, 50: case, 501: CPU, 502: ROM, 503: RAM, 504: timer, 505: memory, 51: three-phase inverter, 53: Hall sensor, 55: current detection amplifier, 71: acceleration sensor, 73: operation part, 75: connector, 79: external storage device, 9: battery, A1: driving axis

The invention claimed is:

1. A drilling tool configured to perform a drilling operation by rotationally driving a tool accessory around a driving axis, the drilling tool comprising:
   a tool body;
   a brushless motor housed in the tool body and configured to drive the tool accessory;
   a first detector configured to detect first information corresponding to a load applied to the tool accessory;
   a second detector configured to detect second information corresponding to a rotation state of the tool body around the driving axis; and
   a control device configured to control operation of the drilling tool,
   wherein the control device is configured:
      to set a conduction angle for the brushless motor based on the first information, and
      to determine, based on the first information and the second information, whether or not excessive rotation of the tool body due to jamming of the tool accessory occurs.

2. The drilling tool as defined in claim 1, wherein:
   the control device is configured:
      to set the conduction angle to be smaller as the load is larger,
      to set the conduction angle to a first conduction angle or to a second conduction angle that is larger than the first conduction angle, and
      to change a determination criterion for determining whether or not the excessive rotation occurs, based on a setting frequency that the first conduction angle has been set.

3. The drilling tool as defined in claim 2, wherein the control device is configured, when the setting frequency is higher than a threshold, to set the determination criterion to be higher than when the setting frequency is equal to or lower than the threshold.

4. The drilling tool as defined in claim 2, wherein:
   the control device is configured:
      to store a setting history of the conduction angle in a storage device, and
      to calculate the setting frequency based on the setting history.

5. The drilling tool as defined in claim 1, wherein:
   the control device is configured:
      to set the conduction angle to be smaller as the load is larger,
      to set the conduction angle to a first conduction angle or to a second conduction angle that is larger than the first conduction angle, and
      to change an output to be produced by the brushless motor when the conduction angle is the first conduction angle, based on a determination history relating to the excessive rotation.

6. The drilling tool as defined in claim 5, wherein:
   the control device is configured, when a frequency that the excessive rotation has been determined to occur is higher than a threshold, to set the output to be produced when the conduction angle is the first conduction angle to be lower than when the frequency is equal to or lower than the threshold.

7. The drilling tool as defined in claim 6, wherein:
   the control device is configured:
      to store the determination history relating to the excessive rotation, and
      to calculate the frequency that the excessive rotation has been determined to occur, based on the determination history.

8. The drilling tool as defined in claim 1, wherein:
   the control device is configured:
      to set the conduction angle to be smaller as the load is larger,
      to set the conduction angle to a first conduction angle or to a second conduction angle that is larger than the first conduction angle, and
      to determine whether or not the excessive rotation of the tool body occurs only when the conduction angle is the first conduction angle.

9. The drilling tool as defined in claim 1, wherein:
   the control device is configured:
      to calculate an index value corresponding to the excessive rotation based on the first information and the second information and determine whether or not the excessive rotation occurs, based on a result of comparison between the index value and a reference value, and
      to change a determination criterion for determining whether or not the excessive rotation occurs, by changing the reference value, or a factor to be used in calculation of the index value.

10. The drilling tool as defined in claim 1, wherein:
the control device is configured to stop the brushless motor driving the tool accessory in response to determining that there is a possibility of the excessive rotation.

* * * * *